INVENTORS.
Edwin Singer
BY Ambros Geissler

Blair & Buckles
ATTORNEYS.

June 4, 1968 E. SINGER ET AL 3,387,277

SYSTEM AND APPARATUS FOR ADDRESSING A CYCLICAL MEMORY BY THE STORED CONTENTS THEREOF

Filed Sept. 2, 1965 15 Sheets-Sheet 11

United States Patent Office 3,387,277
Patented June 4, 1968

3,387,277

SYSTEM AND APPARATUS FOR ADDRESSING A CYCLICAL MEMORY BY THE STORED CONTENTS THEREOF

Edwin Singer, Stamford, and Ambros Geissler, Wilton, Conn., assignors to Telecontrol Corporation, a corporation of Ohio Continuation-in-part of application Ser. No. 437,781, Mar. 8, 1965. This application Sept. 2, 1965, Ser. No. 484,522
34 Claims. (Cl. 340—172.5)

ABSTRACT OF THE DISCLOSURE

A magnetic drum stores data pertaining to plural input stations. The location of stored data for each input station is referenced to an address stored in a drum address track. Data in a search register is compared with the data content of an appropriate drum track. Upon comparison, an output signal issues to cause address circuitry to retain the address associated with the data in the search register. This address is then compared with the address track readout to provide a selected address signal for locating other data associated with the same input station as that in the search register.

This application is a continuation-in-part of copending application for "Automatic Monitoring Systems and Apparatus," Ser. No. 437,781, filed Mar. 8, 1965, which is assigned to the assignee of the present invention.

The present invention also relates to automatic monitoring systems and apparatus for continuously monitoring from a central point individual ones of a plurality of remote operating stations. Changeable or dynamic data from each station is accumulated in associated cyclical memories which also store semi-permanent or static data pertaining to each station. The dynamic data and static data are read from the associated cyclical, memories individully or in collated form as messages pertaining to each station. The present invention is particularly directed to apparatus for readily addressing the associated cyclical memories in order to locate selected data stored therein. The invention is further specifically directed to apparatus for transferring selected data to and from the associated cyclical memories pursuant to the performance of a desired operating function.

The invention is specifically described herein with reference to a production monitoring application. However, the invention has broad applicability to the handling of data developed by a plurality of individual stations, regardless of their character. Further, the apparatus of the invention specifically directed to addressing associated cyclical memories, and to transferring data to and from associated cyclical memories have wide applications in fields other than production monitoring.

Efficient management of large industrial establishments requires accurate, up-to-date information relative to the production and status of the total industrial operation. This proposition was discussed in the above-noted copending application. The overall function of the system disclosed in this application and in the above-noted copending application is to provide a communicatioa link between operating management and the industrial production area. Making current production and status information of individual production machines readily available to management facilitates the efficient scheduling of work. Men, material and tools may be readily assigned to appropriate machines in advance of the time when they become needed. Thus, unnecessary shutdowns are avoided. Abnormalities in production and complete breakdown at any machine can be immediately brought to the attention of appropriate personnel, and measures to rectify the situation can be immediately implemented.

Inventory can be more accurately controlled on the basis of the production and status information gathered from the production area. Thus, over and under production runs, as well as over and under inventory buying, can be eliminated.

The gathering of up-to-date production and status information from the production area to a central point provides for better utilization of personnel. Timekeepers and production expediters are no longer needed in the production area. Material handlers, inspectors and maintenance personnel can be directed to problem areas which become known at the central point. The normal shop paper work required of the supervisory foreman is materially reduced, leaving more time to concentrate on production problems. The foreman can be readily provided with data analysis of production operations in their charge and may thereby provide a basis for the improvement of production efficiency while jobs are running. Operating management no longer has to tour the plant but may merely visit the central control point to see how a particular job is running. Moreover, the information accumulated at the central point can be made readily available to management on hard copy for their study. In addition, the information gathered at the central point can be fed to data processing equipment for the computation of the payroll, or for future production scheduling.

All of the advantages noted above are achieved by the system and apparatus of the above-noted copending application, Ser. No. 437,781. The system and apparatus of the present invention also achieves these advantages, and has the additional capability of more readily locating desired information from the total accumulation of information gathered at the central point from the production area. In the system of the copending application, the accumulated information is stored in a cyclical memory, specifically disclosed as a magnetic drum. Each machine station is assigned predetermined locations or slots on the magnetic drum in which the static and dynamic data pertaining thereto is stored. These slots are located by means of an address track in which are recorded addresses corresponding to each machine station. In order to locate specific data on the drum for readout, or a specific drum slot in which to record data, the operator must address the drum solely through the address track. Thus, for examples, if it is desired to determine the current production data pertaining to a particular job, the operator must refer to a separate index indicating what jobs are being worked on at the various machine stations. Then, appropriate address buttons, one being assigned to each machine station, are depressed to, in effect, select the addresses corresponding to those machine stations from the address track on the drum. Then, and only then, can the desired information be obtained from the drum. Thus, in the system of the copending application, there is no provision for searching for a particular job number, employee number, etc., directly.

The system disclosed and claimed in the above-noted copending application also required separate apparatus for the entry of static data or static correction of dynamic data from the console into the drum and for reading out selected data either for display or output to an output device. This is disadvantageous in that separate electronic data handling apparatus must be provided to perform the two functions.

Accordingly, it is an object of the present invention to provide apparatus for addressing a cyclical memory.

An additional object of the invention is to provide apparatus of the above character for locating selected data stored in associated cyclical memories.

A further object of the invention is to provide apparatus of the above character operating to readily determine if and where selected data is stored in associated cyclical memories.

Another object is to provide apparatus of the above character for finding selected storage locations in associated cyclical memories.

Still another object of the invention is to provide data searching apparatus of the above character.

A yet further object is to provide apparatus of the above character operating in conjunction with other apparatus of the invention to facilitate the transfer of selected data to and from associated cyclical memories.

Yet another object of the invention is to provide apparatus of the above character for collating associated data as stored in associated cyclical memories and as transferred therefrom to an output device.

A further object is to provide apparatus of the above character for processing collated data such that it is transferred to an acceptable format to an output device.

Another object is to provide apparatus of the above character for locating and transferring data from associated cyclical memories either on a selected individual basis, a manually sequencing basis, or on an automatically sequencing basis for total data transfer.

Yet another object is to provide apparatus of the above character for locating and transferring selected data, and all other data associated therewith, from associated cyclical memories for optical display at a data monitoring point.

Still another object of the present invention is to provide a data collection system employing apparatus of the above character.

An additional object is to provide a system and apparatus of the above character for continuously monitoring each one of a plurality of operating stations on an individual basis and accumulating associated data pertaining to events occurring and conditions prevailing thereat in associated cyclical memories for ultimate transfer therefrom either on a selected individual station basis, a manually sequencing station basis, or automatically sequencing station basis to a utilization device.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIGURES 1A and 1B when joined in the manner indicated in FIGURE 1C form an overall block diagram of the disclosed embodiment of the invention;

Corresopnding reference numerals refer to the same parts throughout the several views of the drawings.

*General description*

Figure 1A:
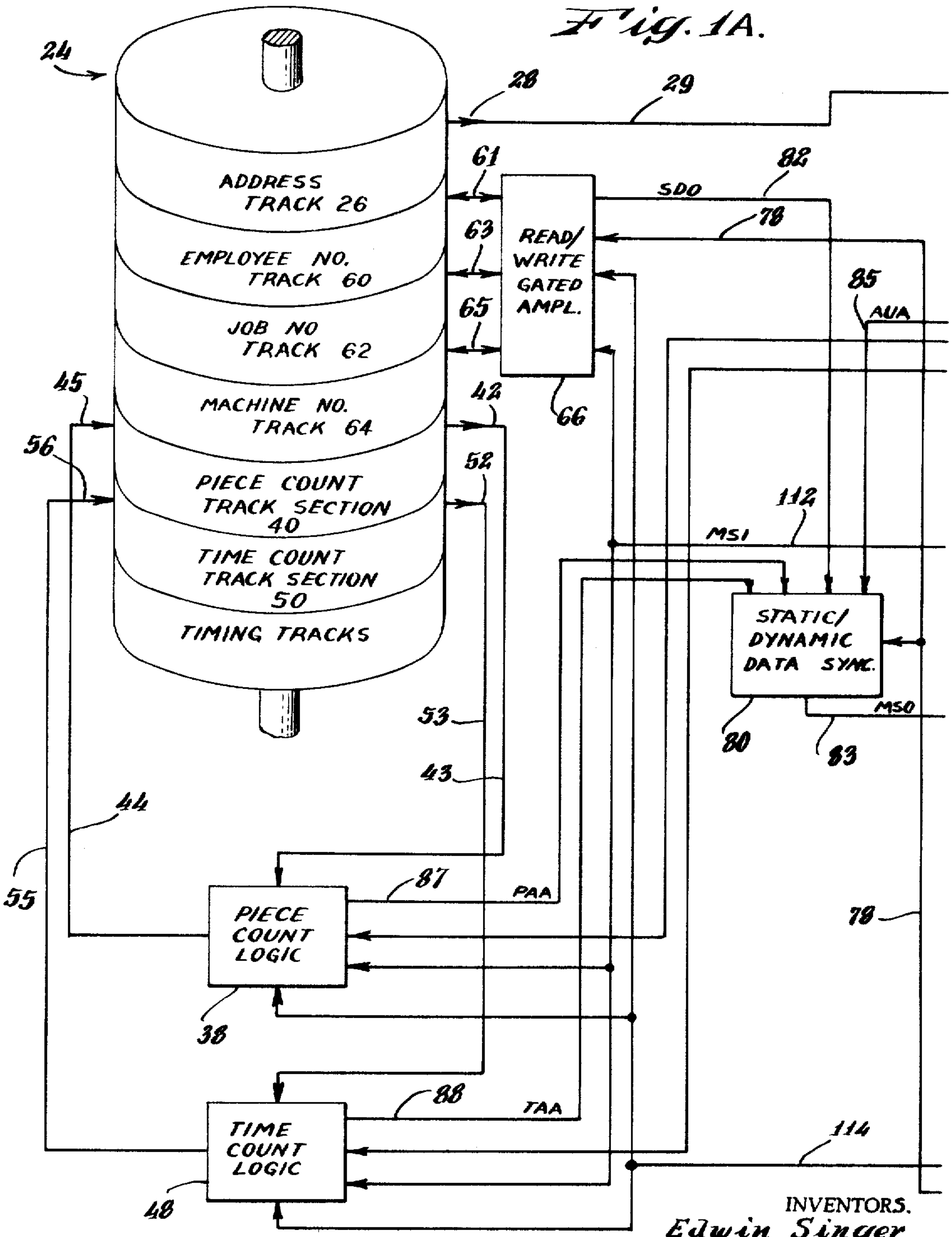
Figure 1C:
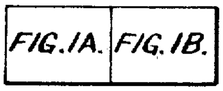
Figure 1B:
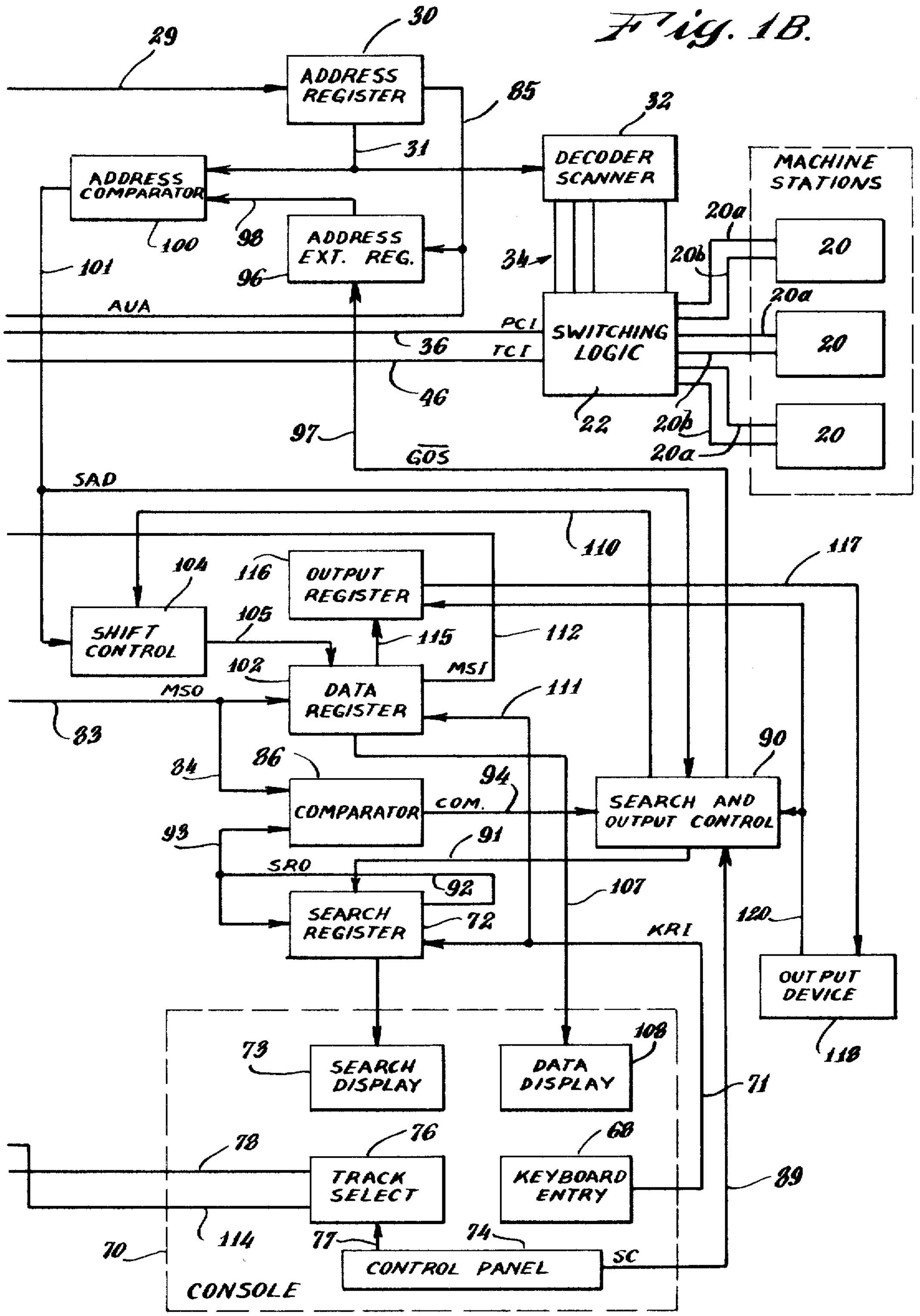

A general understanding of the present invention may be gained from reference to FIGURES 1A and 1B which, when joined together as indicated in FIGURE 1C, form an overall block diagram of the system. According to the disclosed application of the invention, a plurality of remotely located machine stations 20, of which only three are shown in FIGURE 1B, each supply binary coded production data inputs over lines **20*a* and 20*b* to switching logic circuitry 22 located in a central office. As disclosed in detail in the above-noted copending application Ser. No. 437,781, which is incorporated herein by reference, the individual machine stations 20 supply binary coded piece count data over lines 20*a* and binary coded time count data over lines 20*b* to the central office. This piece count and time count data is referred to a "dynamic data" because of its changing character. The piece count data inputs may be generated at the individual machine stations by a machine acutated switch operated upon the completed manufacture of a piece thereat. The time count data inputs on lines 20*b*** may be generated by a time count switch which is manipulated to one of two switch positions depending upon whether that machine station is on productive time or down time.

Referring now to FIGURE 1A of the overall block diagram, a cyclical memory such as a magnetic drum 24 is provided with an address track 26 in which discrete address words are recorded in serial binary bit format; each address word corresponding to a different machine station 20. As the magnetic drum 24 rotates, the address words are read from the drum address track 26 in repeating sequence by a read head 28. The address words are successively supplied over electrical connection 29 to an address register 30. Once each complete address word is entered in address register 30, it is transferred in parallel bit fashion over output lines 31 to a decoder-scanner 32.

The decoder-scanner 32 translates each binary coded address word into straight decimal by energizing a particular one of a plurality of scanner output lines, generally indicated at 34. These scanner output lines 34 are applied to the switching logic circuitry 22 along with the dynamic data inputs from the individual machine stations 20. The energized one of the scanner output lines 34 is connected in the switching logic circuitry 22 so as to interrogate the machine station 20 corresponding to the decimally decoded address word by sampling the binary signal conditions on lines **20*a* and 20*b* connecting that machine station to the switching logic circuitry. Consequently, as each address word is read out in repeating sequence, the machine stations 20 corresponding thereto are interrogated in corresponding repeated sequence. The manner in which this interrogation is accomplished as well as the construction of the decoder-scanner 32 and the switching logic circuitry 22** is specifically disclosed in the above-noted copending application Ser. No. 437,781.

As the result of each interrogation in sequence, a piece count input PCI is supplied on line 36 connected from the switching logic circuitry 22 to piece count logic circuitry 38 (FIGURE 1A). At the same time, accumulated piece count data recorded in a piece count track section 40 of the magnetic drum 24 and corresponding to the interrogated machine station is read out by a read head 42 and supplied over connection 43 to the piece count logic circuitry 38. The piece count data stored in track section 40 constitutes an accumulated count of the number of pieces made at each of the machine stations 20. The piece count data for each machine station is in the form of a discrete binary coded word plus a status bit or flag indicative of the status of the piece count input PCI when the corresponding machine station 20 was last interrogated. The piece count logic circuitry 38 operates to compare the flag bit with the existing piece count input PCI in order to determine whether, since the last interrogation, a piece was made at that particular machine station. If it is determined that no piece was made, the accumulated piece count word, as recorded in the piece count track section 40, is left unaltered. On the other hand, if it is determined that a piece has since been made, the piece count logic circuitry updates the accumulated piece count word by 1 (adds a decimal 1 to the accumulated piece count) and supplies the updated piece count word over connection 44 to be recorded by a write head 45 at the same location in piece count track section 40 occupied by the corresponding piece count word when read out by the read head 42. The manner in which this is accomplished as well as the apparatus of the piece count logic circuitry 38 is specifically disclosed in the above-noted copending application.

In corresponding fashion, a time count input TCI developed as the result of each interrogation is supplied over line 46 connected from the switching logic circuitry 22 to time count logic circuitry 48 (FIGURE 1A). At the same time, the accumulated time count word recorded in a time count track section 50 and corresponding to the interrogated machine station is read out by a read head 52 and supplied over line 53 to the time count logic circuitry 48. Each accumulated time count word has two parts; one being an accumulation of productive time and the other part an accumulation of down time at the corresponding machine station 20. The time count input TCI applied to the time count logic circuitry 48 indicates whether the interrogated machine station 20 is on production time or down time. A clock (not shown) included in the time count logic circuitry 48 periodically generates a timing pulse which signals the time count logic circuitry to update either the accumulated production time portion or the accumulated down time portion of each time count word read from the drum track section 50 depending upon the corresponding time count input TCI. The updated time count words are supplied over line 55 to a write head 56 for recording in the time count track section 50 at the same location occupied by the corresponding time count word when read out by the read head 52. Thus each accumulated time count word, upon occurrence of a timing pulse, is appropriately updated during the interval required for interrogation of all of the machine stations 20 in one complete sequence. The manner in which this is accomplished together with the specific apparatus of the time count logic circuitry 48 is specifically disclosed in the above-noted copending application.

Associated with the individual piece count words recorded in track section 40, the time count words recorded in track section 50 and the address words recorded in drum address track 26 are various semi-permanent or "static data" words recorded in drum tracks 60, 62, and 64. For example, there may be recorded in drum track 60 coded employee numbers identifying the employee operating the industrial machine at the various machine stations 20. In drum track 62 there may be recorded coded job numbers identifying the particular job on which the various machine stations are working. The identification numbers of the machines at the various machine stations 20 may be stored in coded form in drum track 64. Each of the recorded data words pertaining to a particular machine station 20 occupy corresponding relative locations in their respective drum tracks. Inasmuch as the static data recorded in drum tracks 60, 62, 64 is relatively unchanging as compared to the dynamic data stored in drum tracks 40 and 50, entry and readout of the static data tracks may be carried out by dual function read/write heads 61, 63, and 65 sharing a common read/write gated amplifier 66 as disclosed in the above-noted copending application Serial No. 437,781.

Now that the static and dynamic data words pertaining to the various machine stations 20 are recorded on the magnetic drum 24, it will eventually become necessary to locate selected data words on the drum for readout, or a selected track location for recording externally generated data words. Thus, means must be provided for addressing the drum 24 which may be considered as a plurality of associated cyclical memories; each drum track being a cyclical memory commonly associated in that they are carried by a single drum 24. In the system of the above-noted copending application, addressing the drum is accomplished solely by way of the drum address track. Thus, if it was desired to determine up-to-date production data for a particular employee, the console operator had to refer to an index giving the particular machine station (address word) where he is working. Then the operator must press the address button associated with that machine station and when that machine station is interrogated in the normal course of updating dynamic data (interrogation), a selected address signal SAD is generated. This selected address signal SAD occurs at a time when the dynamic and static data recorded on the drum 24 for that machine station is accessable by the various read and write heads. It will thus be seen that there is no provision in the system of the above-noted copending application for directly locating recorded static and dynamic data directly by means of employee number, job number, machine number, or for that matter piece count or time count. It will be understood that as a practical matter, drum addressing would not be generally performed on the basis of dynamic data but rather on the basis of one of the various static data words.

To overcome this deficiency of the system disclosed in the above-noted copending application, according to the present invention a particular data word to be located on the drum 24, whether address word, employee number, job number, machine number, piece count word, or time count word, is entered by means of a keyboard entry circuit 68 located at the console 70. The keyboard entry circuit 68 translates the depression of a decimal digit key into a binary coded digit KRI transmitted over connection 71 for entry into a search register 72 (FIGURE 1B). The word entered digit by digit is displayed optically at the console 70 by a search display unit 73. The console operator then depresses an appropriate button at the control panel 74 identifying the type of word entered into the search register 72. The control panel 74 conditions track select circuitry 76 over control cable 77 accordingly. It will be understood from the description to follow that the track select circuitry 76 actually performs a word select function. The track select circuitry 76 supplies an appropriate output signal over a control cable 78 to a static/dynamic data synchronizer circuit 80 as well as to the read/write gate amplifier 66. If for example a particular employee number has been entered into the search register 72 and this fact has been duly indicated to the track select circuitry 76, the read/write gated amplifier 66 is conditioned by the signal from the track select circuitry on cable 78 so as to enable the read/write head 61 to read out employee numbers from the employee number track 60 and to transmit these coded employee number words as static data outputs SDO over connection 82 to the static/dynamic data synchronizer 80. The synchronizer 80 is also conditioned by the track select circuitry 76 over cable 78 to pass the coded employee number words as main store outputs MSO over connections 83 and 84 to a serial comparator 86. At the same time, address words from the address register 30 are being continuously applied over line 85 as another separate input AUA to the static/dynamic data synchronizer 80. Similarly, accumulated piece count words and accumulated time count words are continuously applied over lines 87 and 88, respectively, as separate inputs PAA and TAA to the static/dynamic data synchronizer 80. In the situation where an employee number word is to be searched, the static/dynamic data synchronizer 80 ignores the address word inputs AUA and the dynamic data word inputs TAA, PAA and passes only the employee number words as the main store outputs MSO. It will be seen that the system of the present invention has the capability of selecting any of the inputs to the synchronizer 80 as main store outputs MSO with the selection of the kind of static data words being accomplished by appropriate conditioning of the read/write gated amplifier 66.

Assuming that a selected employee number is to be located, the console operator depresses a search command button (not shown) at the control panel 74 applying a search command signal SC over line 89 to a search and output control circuit 90. In response thereto, the search and output control circuit 90 conditions the search register 72 over line 91 such that the employee number word stored therein is continuously recirculated from its output SRO over line 92 and back to its input. At the same time, the recirculated employee number word SRO is applied to the other input of the comparator 86 over line 93. Thus, the employee number word being recirculated through search register 72 is compared with each employee number word read from the employee number track 60 of the drum 24 and gated through as the main store output MSO to the other input of the comparator 86. If and when comparison is achieved, indicating that the employee number searched for is indeed stored in the employee number track 60, a comparator output signal COM is applied to the search and output control circuit 90 over line 94.

While this search operation is being carried out, the address words read from the drum address track 26 and entered into the address register 30 are read out during the next word time as AUA on line 87 for entry into an address extension register 96. Thus, each address word read into address register 30 appears one word time later in the address extension register 96. As was explained in the above-noted copending application, the address words corresponding to the various machine stations 20 are read out from the drum one word time in advance of the time when the corresponding static and dynamic data words recorded on the magnetic drum 24 become accessible. This is done in order to provide time for operation of the decoder-scanner 32 and the switching logic circuitry 22.

When comparison is achieved in comparator 86, the output signal COM signals this fact to the search output control circuit 90. In response thereto the search and output control circuit 90 supplies an output $\overline{GOS}$ over line 97 effective to disable the address extension register 96 at a time when the address word corresponding to the located employee number is held in the address extension register. As a consequence, address words are no longer shifted through the address extension register 96 and the address word corresponding to the located employee number is retained therein.

At this point the address word retained in the address extension register 96 is applied over connection 98 to one input of a comparator 100 for comparison with the address words serially read into the address register 30 from the drum address track 26. Thus, as the machine station 20 corresponding to the located employee number is interrogated in each cycle, comparison between the contents of the address register 30 and the address extension register 96 is detected by the comparator 100. As a result, a selected address signal SAD is generated on comparator output line 101.

It will thus be seen that the selected address signal SAD appears at a time when the static and dynamic data words as well as the address word ssociated with the located employee number are available as main store outputs MSO at the output of the static/dynamic data synchronizer 80.

Assume, for example, that the console operator desires to determine what job number the located employee is working on. The read/write gated amplifier 66 and the static/dynamic data synchronizer 80 are appropriately conditioned from the track select circuitry 76 such that job number words are gated through as main store outputs MSO on output line 83 connected also to the input of a data register 102. A shift control circuit 104 is connected to receive the selected address signal SAD from the comparator 100 over line 101. When the selected address signal SAD occurs, the shift control circuit 104 conditions the data register 102 over line 105 to accept the job number then appearing as the main store input MSO. Thus, the job number read into the data register 102 is associated with the located employee number. This job number word may be transmitted over cable 107 to a data display 108 for optical presentation to the console operator.

If it is then desired to know the number of pieces that this particular employee made, the track select circuitry 76 is conditioned so as to in turn condition the static/dynamic data synchronizer 80 allowing piece count words to be gated through as main store outputs MSO. When the selected address signal SAD occurs, the associated piece count word is then the main store output MSO and the shift control circuit 104 conditions the data register 102 over line 105 to accept it. It can then be displayed to the console operator in the data display unit 108.

It will thus be seen that the console operator may select any static or dynamic data word from which he desires to know the static or dynamic data associated thereto by entering the data word to be located in the search register 72. A search mode is instituted and when comparison is achieved in comparator 86, the selected address signal SAD is developed to provide ready access to all data words associated with the located data word.

The occasion often arises when it is desired to enter a particular data word into a selected word location on the drum 24. According to the present invention this can be done also by the keyboard entry circuit 68. In the carrying out of an entry mode, the console operator first enters a selected data word associated with the data word to be entered by way of the keyboard entry circuit 68 into the search register 72 in order to locate the appropriate area on the drum 24. A search operation is then performed in the manner outlined above in order to derive the appropriated selected address signal SAD. If at this point a second keyboard entry is made by way of the keyboard entry circuit 68, the search and output control circuit 90 conditions the shift control circuit 104 over line 110 such that the second keyboard entry is made in the data register 102 over lines 71 and 111 rather than the search register 72. This entry into the data register 102 is the word which is to be recorded on the drum 24. From the control panel 74, the track select circuitry 76 and the search and output control circuit 90 are conditioned such that the shift control circuit 104 under the synchronization of the selected address signal SAD empties the word held in the data register 102 onto output line 112 as a main store input MSI. It is seen from FIGURE 1A that output line 112 is connected to the read/write gated amplifier 66, the piece count logic circuitry 38 and the time count logic circuitry 48. The track select circuitry 76 suitably conditions the appropriate one of these circuits over control cable 114 such that the data word read from the data register 102 is recorded in the proper track on the magnetic drum 24. The proper location of the recorded data word in a particular data track on the drum is insured by the selected address signal SAD.

As an additional operating mode of the system of the present invention, data words read out from the magnetic drum 24 into the data register 102 are transferred over connection 115 to an output register 116 for transmission over cable 117 to an on-line output device 118, such as a teletypewriter. This output mode may be carried out either selectively or automatically when all of the static and dynamic data words for all of the machine stations 20 are collated into messages and transmitted to the output device 118 for print out. In the selective output mode, the machine station selected for output is located by instituting a search operation as generally described above. Once the selected machine station is located, the selected address signal SAD becomes available for locating the associated static and dynamic data words recorded on the magnetic drum 24. The track select circuitry 76 is then conditioned from the control panel 74 to sequentially select the various drum tracks for readout in a desired message order. The entry of the proper data word into the data register 102, once track selection has been made by the track select circuitry 76 in each instance, is insured by the selected address signal SAD. Once the data register 102 is filled with each data word, the search and output control circuit 90, in response to signals from the output device 118 over connection 120, controls the shift control circuit 104 to transfer the data word to an output register 116 digit by digit for transmission over cable 117 to the output device 118.

In the automatic or all output mode, the search and output control circuit 90 conditions the address extension register 96 such that it holds the address word for the first machine station 20, whose static and dynamic data is to be first transmitted to the output device in a predetermined message output sequence. When a complete message for the first machine station has been transmitted to the output device 118, the search and output control circuit 90 controls the address extension register 96 with the signal $\overline{GOS}$ sent on line 97 to accept and hold the address word corresponding to the second machine station 20 in the message output sequence. The same operation is repeated until the messages for all of the machine stations 20 have been transmitted to the output device 118.

DETAILED DESCRIPTION

*Drum layout.*—The individual words stored on the magnetic drum 24 and processed by the disclosed embodiment of the present invention are comprised of seven digits. A seven digit word length could then accommodate a seven digit employee number or a seven digit machine number. Each digit of the word includes five binary coded bits which express the digit in binary coded decimal (BCD) format. The bits making up each digit are arranged with the positional significance 1, 2, 4 and 8 in the binary code format. The fifth bit is an odd parity bit for error checking purposes. With five bits per digit and seven digits per word, each word is thirty-five bits in length. For purposes of the present disclosure, a message is assumed to comprise five words, all of which pertain to one machine station 20. Accordingly, a message is then 175 bits in length.

It will be further assumed that the circumference of the drum 24 is such that a single circumferential track has the capacity to hold one hundred seven-digit words. Accordingly, the drum 24 has the capacity to handle the address words DAD for one hundred machine stations 20 in a single address track. Similarly, the employee numbers for one hundred machine stations could be handled in a single circumferential track. The same is true of machine numbers and job numbers. The piece and time count word tracks are split up into two separate tracks each as specifically disclosed in the above-noted copending application.

In some installations, the system may be called upon to service more than one hundred machine stations. Additional drum data tracks are then used. Track switching is preferably employed in order that all of the data words of a particular type are handled by the same data processing circuitry. Thus, during one drum revolution the first one hundred machine stations are interrogated, the second one hundred machine stations are interrogated during the next drum revolution, etc. After all the machine stations are interrogated, the sequence is repeated. By the same token, data words stored on the drum are accessible only once in each sequence or system operating cycle consisting of two, three, or perhaps four drum spins. At the same time, the drum address track 26 (FIGURE 1A) remains as a single circumferential track with the hundreds digit of the address words being generated externally under the control of a counter counting the drum spins in each system cycle. The address words including this externally generated hundreds digit are decoded in the decoder-scanner 32 (FIGURE 1B) to energize a particular scanner output line 34; there being one such output line for each machine station.

Figure 2:
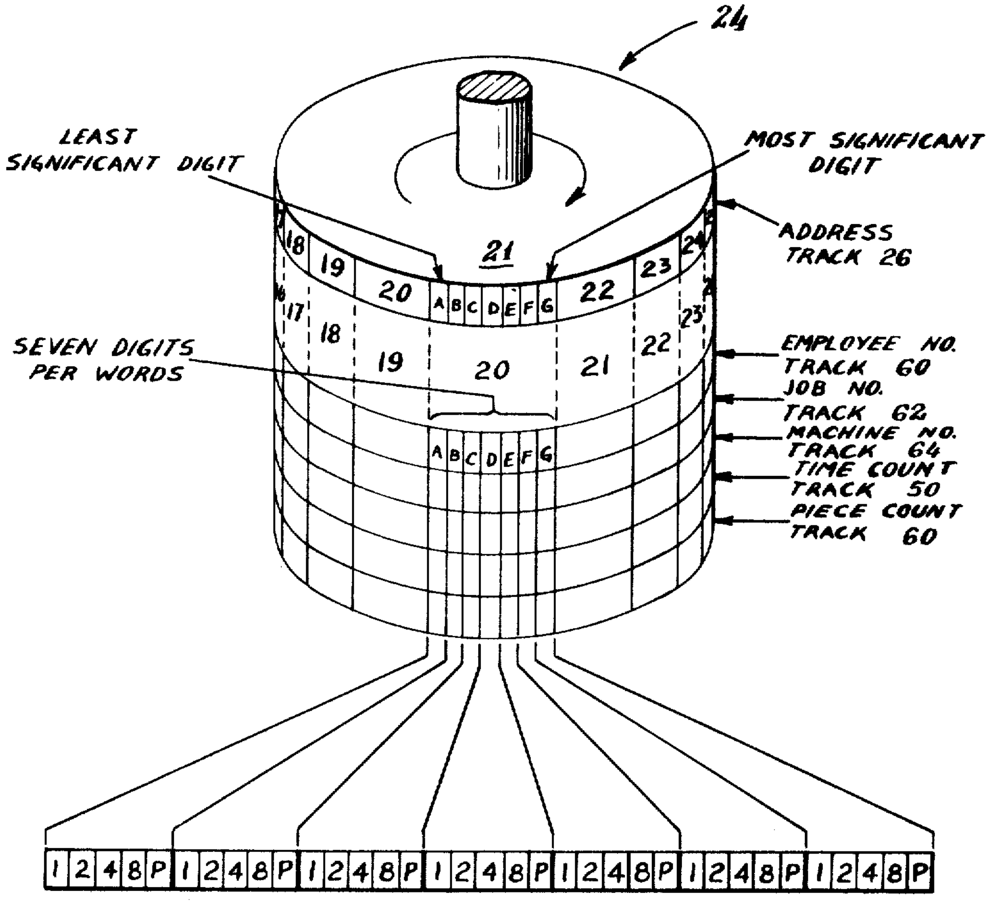
FIGURE 2 is a physical layout of a portion of the magnetic drum of FIGURE 1A showing the preferred physical relationship of the locations in which are recorded the various kinds of data processed by the system and apparatus of the invention.
Figure 3:
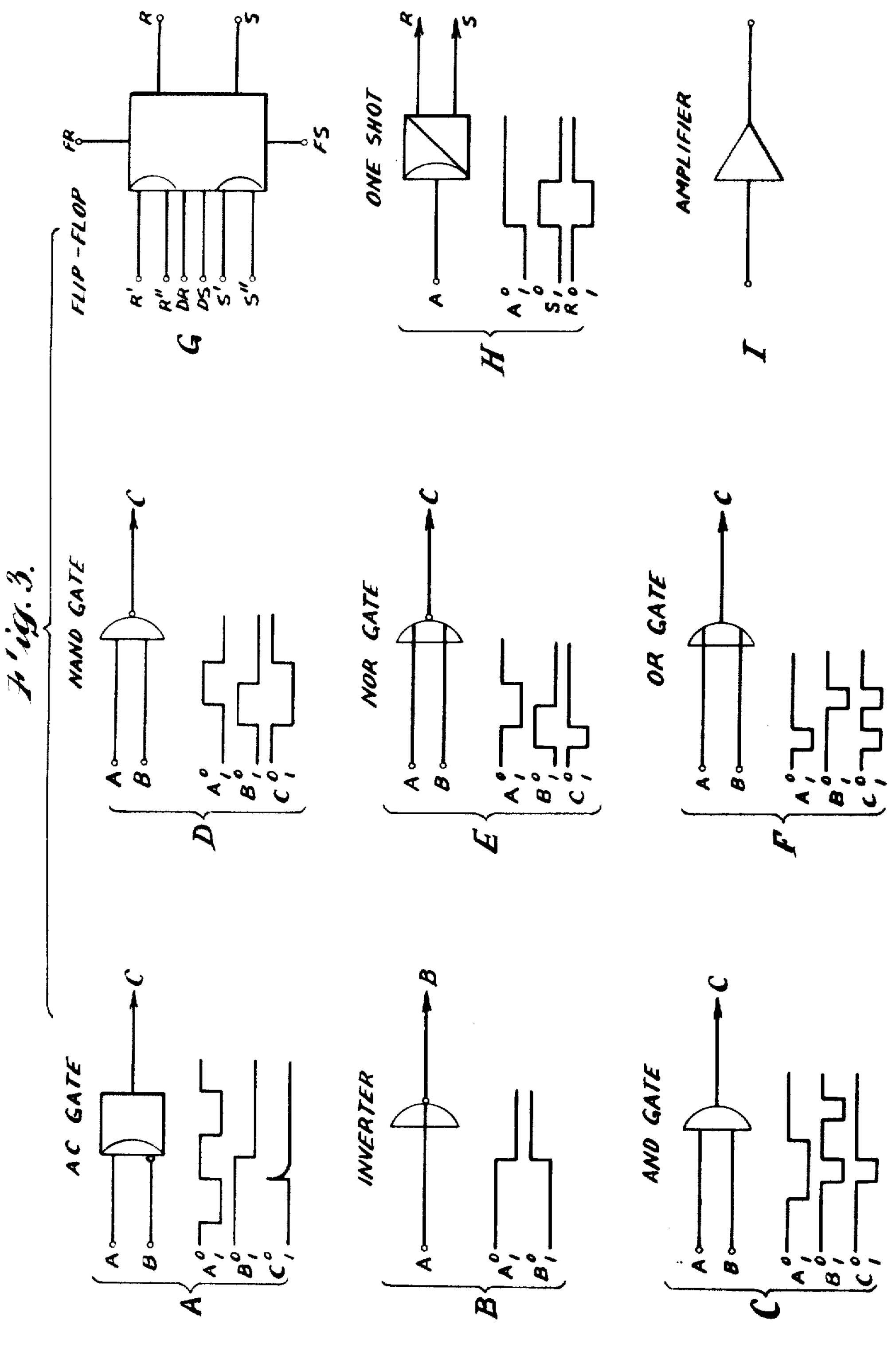
FIGURE 3 is a diagram of the various electronic logic elements employed in the specific embodiment of the invention disclosed, together with signal diagrams illustrating the logic functions.

The physical layout showing the positional relationship of the bits, digits and words as recorded on the drum 24 is shown in FIGURE 2. The address words recorded in the address track 26 are recorded consecutively from 00 to 99 for the one hundred machine stations. The digit makeup of the address word 21 is shown in FIGURE 3. Of the seven digit slots shown for address word 21, digit slot A, which is recorded and read out first, is the least siginficant digit slot, while digit slot G, recorded and read out last, is the most significant digit slot. Since each address word DAD is only two digits long, the least significant digit of the address word is recorded in digit slot C while the most significant digit is recorded in digit slot D. Accordingly, for address word 21, the decimal 1 is recorded serially in digit slot C in BCD format, least significant bit first, while the decimal 2 is similarly recorded in digit slot D. The reason that the address word DAD is recorded in digit slots C and D is to allow the digit times corresponding to digit slots E, F and G for the address register 30 and the decoder-scanner 32 to process the address words.

As seen in FIGURE 2, the data words for the 20th machine station are recorded in parallel drum tracks 40, 50, 60, 62 and 64 in word slot locations vertically aligned under the address word for the 21st machine station. Consequently, the address word for the 20th machine station is read out in advance to prepare the system for processing all of the data words concerned with that machine station when they become accessible as recorded on the drum 24 one word time later.

As seen below the drum 24 in FIGURE 2, the seven digit slots making up a single word are blown up to show the binary coded decimal (BCD) format in which the individual bits of the seven digits are recorded and read out serially on a drum track, least significant bit, least significant digit first.

*Logic definitions.*—In the operation of the disclosed embodiment of the invention, a logical one in the binary code format is expressed by a negative signal level of from −8 to −12 volts while a logical zero is expressed by a zero or ground signal level, in addition, the logic circuits interpret an open or "floating" input line as a logical one.

The various logic circuits used in the system and apparatus of the invention are shown in FIGURE 3 at (A)

through (I). The logic symbol for an A.C. gate is shown at (A). The A.C. gate performs the dual function of an AND gate and a differentiator, and its output C is generally utilized as direct set or direct reset inputs to trigger a flip-flop. As seen from the signal diagram, when the input B is a logical zero, the A.C. gate is enabled to pass a logical one to zero signal level transition (positive transition) in the form of a positive pulse C. When the input B is a logical one, the A.C. gate is completely disabled.

An inverter logic symbol is shown at (B). The output B of the inverter merely complements the input A. Accordingly, if the input A is a logical zero, the output B is a logical one, and vice-versa.

The logic symbol for an AND gate is shown at (C). The output C from the AND gate is a logical one only when both inputs A and B are logical ones.

The logic symbol for a NAND gate is shown at (D). As seen in the signal diagram, the output C from the NAND gate is a logical zero when both of its inputs A and B are a logical one. When either of the inputs A and B go to a logical zero, the output C goes to a logical one.

A NOR gate is shown at (E), and its output C is a logical one when its inputs A and B are both a logical zero. If either of its inputs A and B go to a logical one, the output C switches to a logical zero. The logical symbol for an OR gate is seen at (F). The output C from the OR gate is a logical one when either of its inputs A and B goes to a logical one.

The logic symbol for a bistable multivibrator or flip-flop is shown at (G). Its output R is a logical one when the flip-flop is in the reset condition and goes to a logical zero when the flip-flop is set. The set output S exactly complements the reset output R. Thus, the set output S is a logical one when the flip-flop is set and a logical zero when the flip-flop is reset. Inputs FR and FS to the flip-flop are forced reset and forced set inputs, respectively. One or the other of these inputs is pulsed generally when the system is first turned on to insure that the flip-flop is forced into the state it should initially assume. The inputs R′, R″, and DR are operational inputs used to trigger the flip-flop to its reset condition while inputs S′, S″ and DS are operational inputs used to trigger the fiip-flop to its set condition. Inputs DR and DS are direct reset and direct set inputs to the flip-flop and are effective in and of themselves to trigger the flip-flop. Thus. a positive pulse on the input DR triggers the flip-flop to its reset condition while a positive pulse on the input DS triggers the flip-flop to its set condition. Generally, the DS and DR inputs to a flip-flop are generated by A.C. gates. Inputs R′ and R″ are gated reset inputs effective to reset the flip-flop when both are a logical one and either one goes to a logical zero. Similarly, inputs S′ and S″ are gated set inputs effective to set the flip-flop when both are a logical one and either goes to a logical zero.

The logic symbol for a monostable multivibrator or one-shot is shown in (H). When its input A goes from a logical one to a logical zero, its reset output R, which is normally a logical one, goes to a logical zero for a predetermined time period. The one-shot then automatically returns to its single stable state whereupon the reset output R returns to a logical one. The set output S merely complements the reset output R.

The logical symbol for an amplifier is shown at (I). The amplifier is used where necessary to increase the drive capability of a signal whenever the loading is too great for the driving stage. As will be pointed out in the detailed description to follow, some of the amplifiers are gated power amplifiers. As such, the amplifier will have a signal input which is to be amplified and a gating input. When the gating input is a logical one, a logical one input signal level will be amplified and passed to the output.

All of the above described logic circuits are of convention circuit construction. Such circuits to perform the above described logic functions may be obtained from digital system build block suppliers such as Magnetics Research Company, Inc. of White Plains, N.Y.

Figure 4:
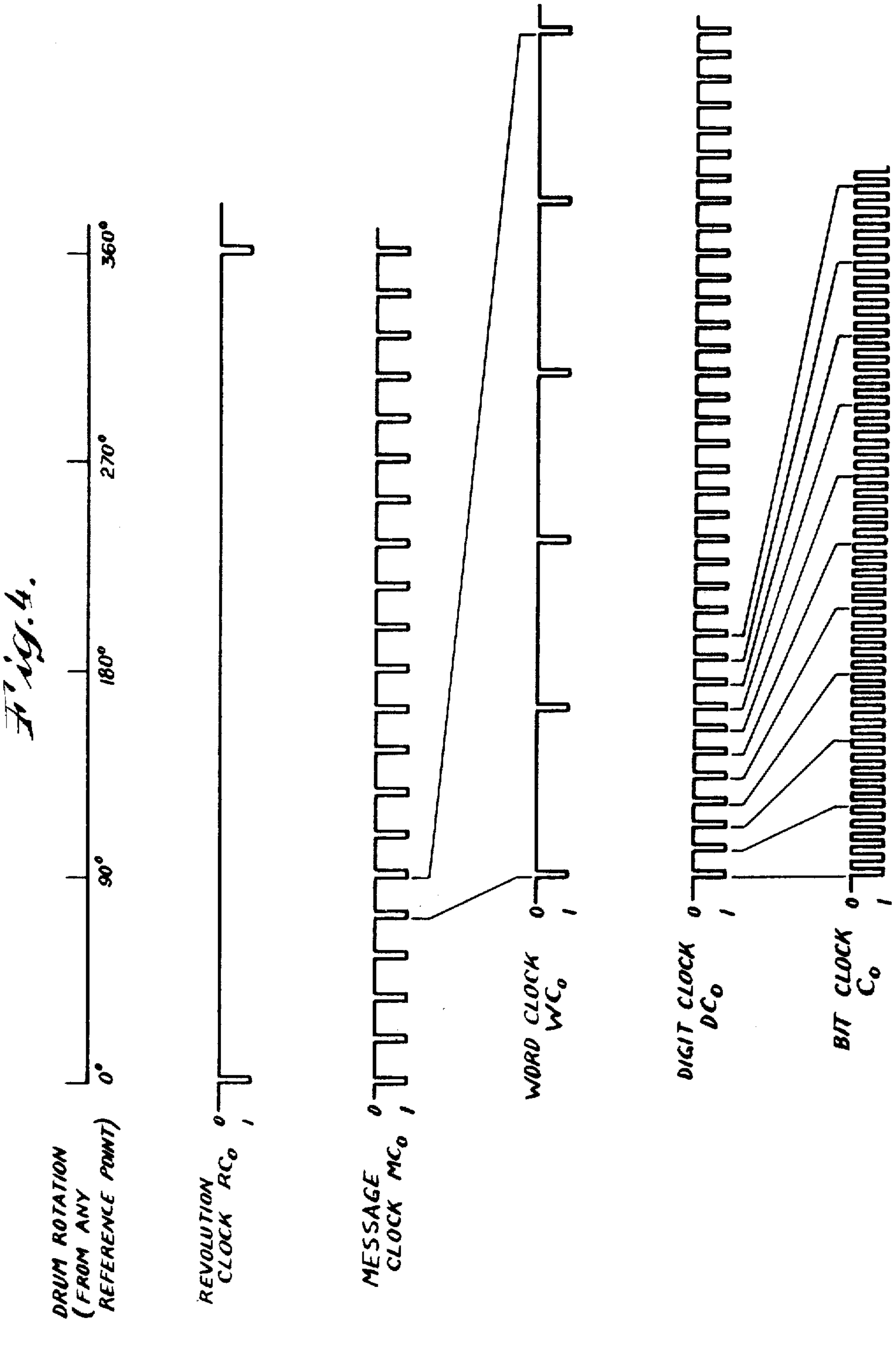
FIGURE 4 is a timing diagram of the various clock pulses recorded on the magnetic drum of FIGURE 1A used for synchronizing the operation of the system and apparatus of the invention.

*Timing.*—The magnetic drum 24 is provided with five prerecorded clock tracks which are used in synchronizing the multiplicity of operations of the system. The pattern of the five prerecorded clock tracks is shown in FIGURE 4. In one clock track there is recorded a single pulse which is read out at the beginning of each revolution of the drum 24 and is termed a revolution clock pulse $RC_0$. A second prerecorded clock track includes twenty pulses recorded at equally spaced increments about the drum 24. Each of these twenty pulses is read out as a message clock pulse $MC_0$. In the interval between two consecutive message clock pulses there is prerecorded on another clock track five word clock pulses $WC_0$. Since there are twenty message clock pulses $MC_0$ in one drum revolution, the number of word clock pulses $WC_0$ recorded about the drum 24 is one hundred. There are seven digit clock pulses $DC_0$ prerecorded on another drum clock track in the interval between consecutive word clock pulses $WC_0$. For the interval between consecutive digit clock pulses, there are five bit clock pulses $C_0$ prerecorded on another drum track. It will thus be seen that there are 700 digit clock pulses $DC_0$ prerecorded in the digit clock track and 3500 bit clock pulses $C_0$ prerecorded in the bit clock track.

When the various clock pulses shown in FIGURE 4 are read from the drum clock tracks, they are reshaped and effectively reclocked with bit clock pulses $C_0$. In this way each and every one of the clock pulses, i.e., the revolution clock pulse $RC_0$, the message clock pulse $MC_0$, etc., are precisely aligned in time with a bit clock pulse $C_0$.

Figure 5A:
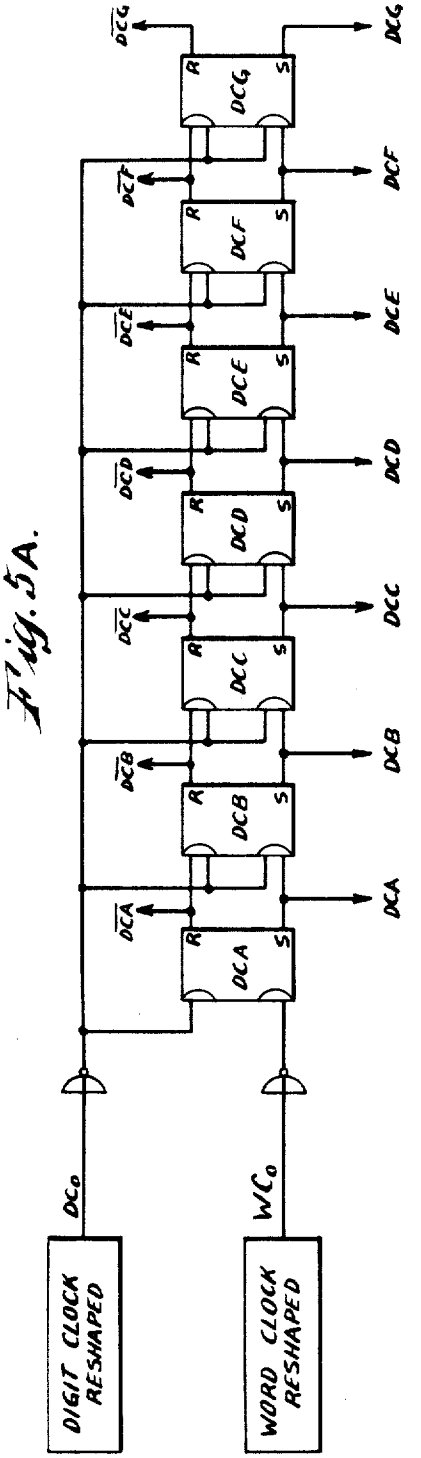
FIGURE 5A is a detailed logic block diagram of a digit counter used to generate digit timing signals.

Referring now to FIGURE 5A, the reshaped word clock pulse $WC_0$ and the reshaped digit clock pulses DC are used to generate additional timing pulses serving to identify the individual digit slots A through G in each word. As seen in FIGURE 5A, a series of flip-flops DCA through DCG are interconnected for form a digit counter. Each word clock pulse $WC_0$ is inverted in an inverter in order to provide a one to zero leading edge signal transition (positive) effective to trigger the first flip-flop DCA to its set condition. The digit clock pulses are applied through an inverter to the reset input of flip-flop DCA, and to the set and reset inputs of the remaining flip-flops DCB through DCG. The flip-flop DCA can be made reversible by feeding its set output S back internally to its gated reset input and by feeding its reset output R back internally to its gated set input. Consequently, when the flip-flop DCA is in its reset state, its reset output R is a logical one and, when fed back to the gated set input, serves to enable the gated set input circuitry of the flip-flop. On the other hand, the set output S is a logical zero which, when applied internally to the gated reset input effectively inhibits any input tending to reset the flip-flop.

This being the case, it will be seen that although the leading edge of an inverted digit clock pulse $DC_0$ applied to the gated reset input and an inverted leading edge of a word clock pulse $WC_0$ simultaneously applied to the gated set input are both effective triggering pulses for the flip-flop DCA, the flip-flop will be triggered to its set condition by the word clock pulse $WC_0$ inasmuch as it was previously in the reset condition. The flip-flop set output is a logical one for the interval of the least significant digit slot G of each word. The digit clock pulses $DC_0$ serve to shift this logical one through the stages DCB through DCG in sequence so as to generate in corresponding sequence the digit timing signals DCA through DCG, and their complements $\overline{DCA}$ through $\overline{DCG}$, marking the digit slots of each word. Each word clock pulse $WC_0$ causes the digit counter to recycle and again generate the digit timing signals DCA through DCG and $\overline{DCA}$ through $\overline{DCG}$ in sequence.

Figure 5B:
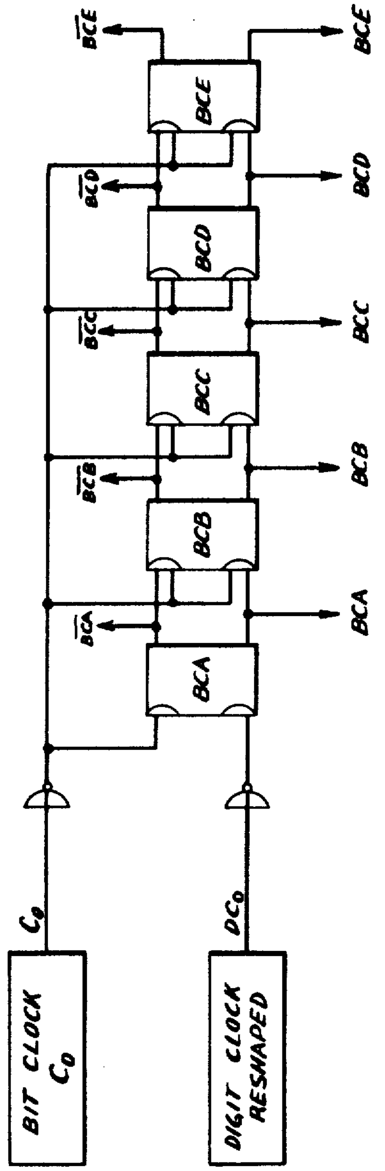
FIGURE 5B is a detailed logic block diagram of a bit counter used to generate bit timing signals.

In a corresponding manner, the reshaped digit clock pulses $DC_0$ and the bit clock pulses $C_0$ are applied to a bit counter (FIGURE 5B) comprised of flip-flops BCA through BCE to generate bit timing signals BCA through BCE, and their complements $\overline{BCA}$ through $\overline{BCE}$, identifying the individual bit slots of each digit. According to the binary decimal coded format, bit timing signals BCA and $\overline{BCA}$ identify the least significant bit slot 1 of a digit, timing signals BCD and $\overline{BCD}$ the most significant bit slot 8, and bit timing signals BCE and $\overline{BCE}$ the parity bit slot P.

Figure 6:
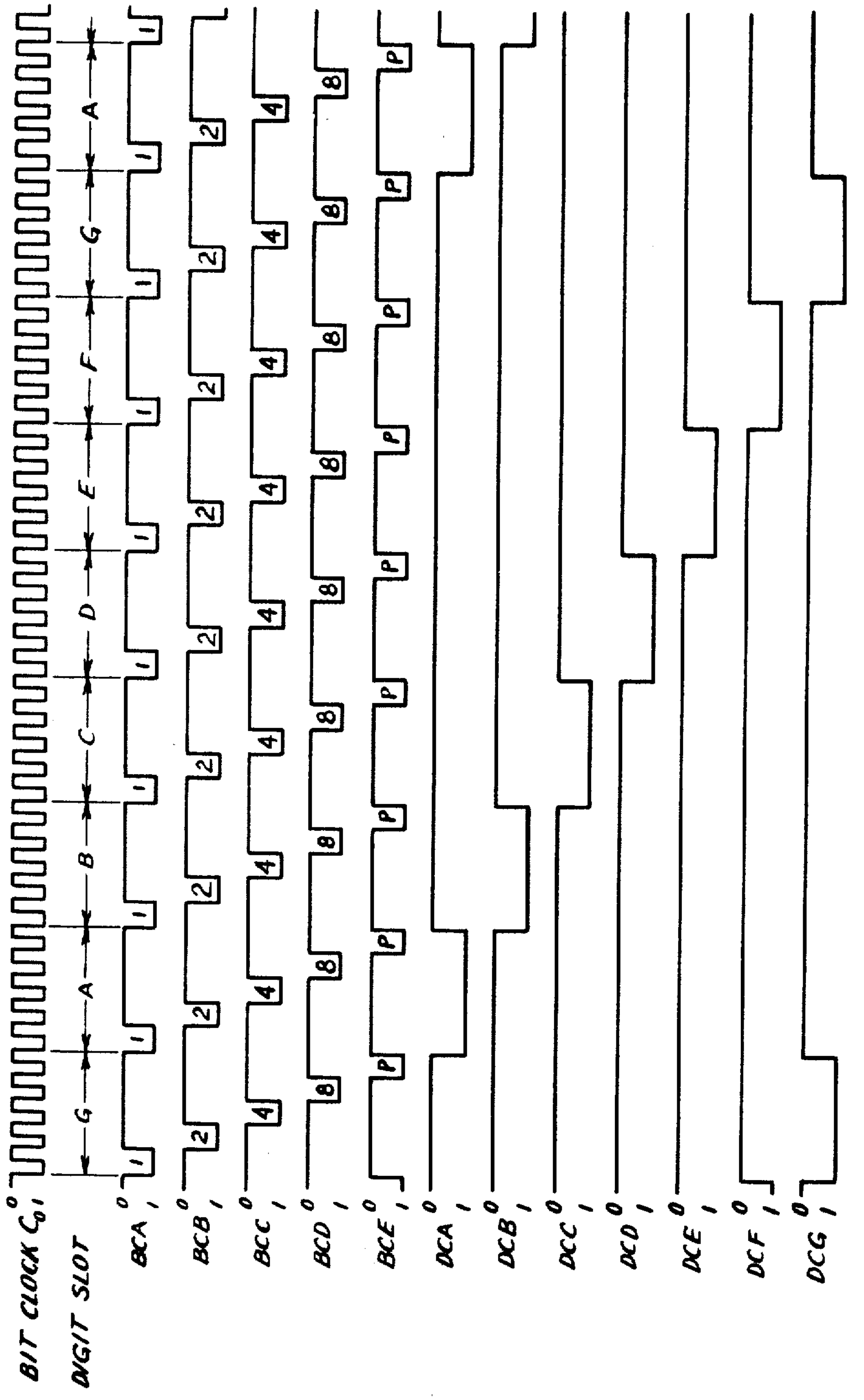
FIGURE 6 is a timing diagram of the digit and bit timing signals generated by the digit and bit counters of FIGURES 5A and 5B.

The timing relationship of the digit timing signals DCA–DCG generated by the digit counter (FIGURE 5A) and the bit timing signals BCA–BCE generated by the bit counter (FIGURE 5B) is shown in FIGURE 6. Timing signals $\overline{DCA}$–$\overline{DCG}$ and $\overline{BCA}$–$\overline{BCE}$ (not shown) are the logical complements of timing signals DCA–DCG and $\overline{BCA}$–$\overline{BCE}$, respectively.

Figure 7:
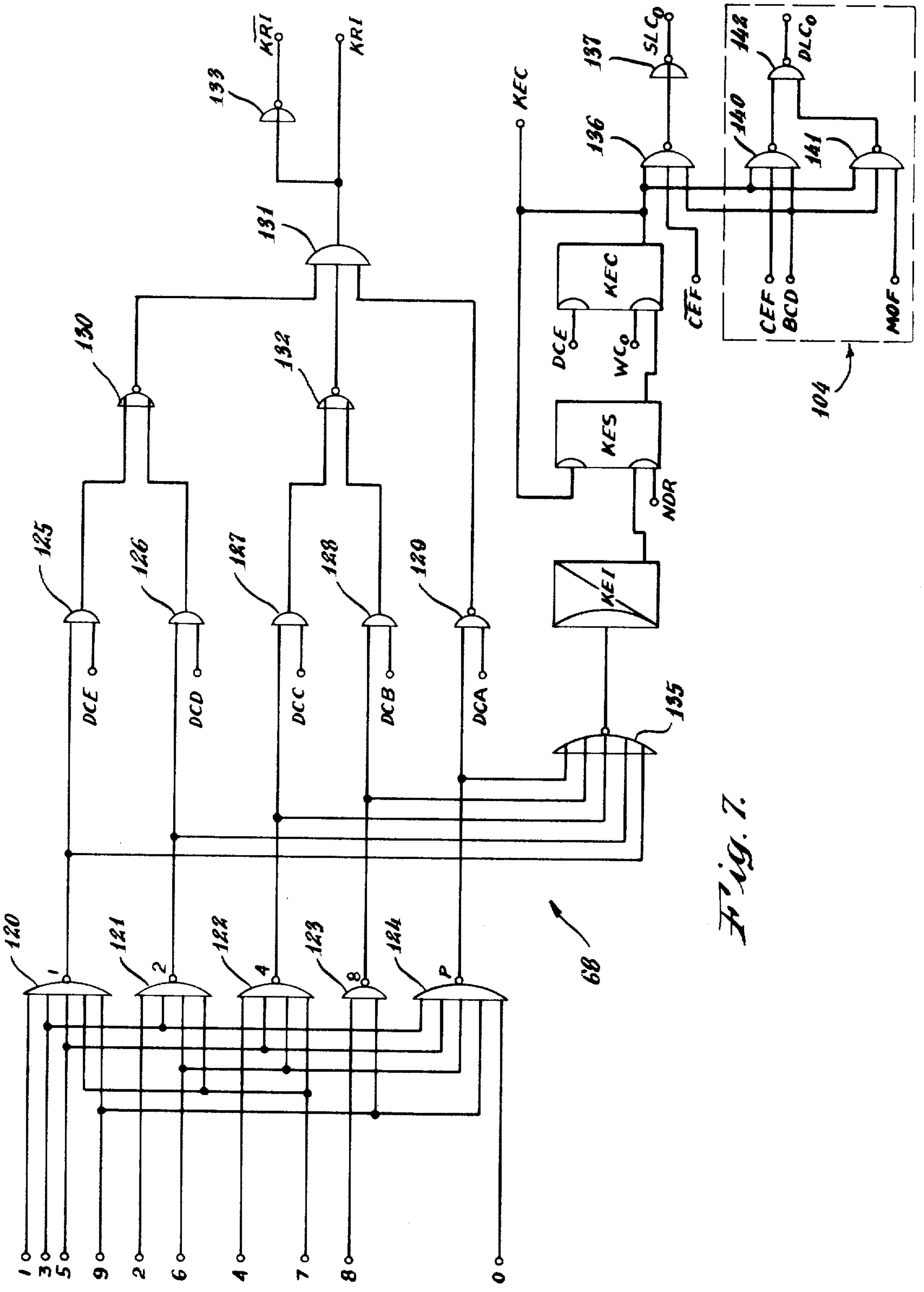
FIGURE 7 is a detailed logic block diagram of the keyboard entry circuit and a portion of the shift control circuit of FIGURE 1B.

*Keyboard entry ciruit.*—The keyboard entry circuit 68, generally disclosed in FIGURE 1B, is shown in detail in FIGURE 7. Decimal input lines, labelled 0 to 9, inclusive, are selectively connected to separate inputs of a plurality of NAND gates 120–124. The decimal input lines 0 through 9 are energized from a conventional keyboard (not shown). The connection of the individual decimal input lines to the various NAND gates 120–124 is carried out in logical fashion such that a decimal input is converted to a corresponding binary coded decimal (BCD) output in 1, 2, 4, 8, P (parity) format. Initially, all of the decimal digit input lines 0 through 9 are floating or at a logical one. Consequently, the outputs at each of the NAND gatese 120–124 is a logical zero. These logical zero outputs from NAND gates 120–124 are individually applied to the first inputs of AND gates 125–128 and a NAND gate 129. The gates 125–129 are strobed by digit timing pulses DCA through DCE applied to their second inputs. The outputs of AND gates 125 and 126 are gated together in a NOR gate 130 whose output is supplied as one input to an AND gate 131. The outputs of AND gates 127 and 128 are gated together in a NOR gate 132 whose output is applied as a second input to AND gate 131. The output of NAND gate 129 is applied as a third input to AND gate 131. The output KR1 of AND gate 131 and its complement $\overline{KR1}$ developed by an inverter 133 provide the inputs over connection 71 to the search register 72 and data register 102 of FIGURE 1B. The KR1 is a logical one for each binary one bit and a logical zero for each binary zero bit of a digit entry.

It will be seen from keyboard entry circuit 68 that if by depression of a particular key at the console 70, a corresponding decimal input line is energized by clamping it to ground, a logical zero will be supplied to those gates 120–124 to which the input line is connected. As a result, the BCD conversion of this decimal input is developed at the outputs of the gates 120–124, including an odd parity bit. Thus, if the decimal one input line is grounded, NAND gate 120 produces a logical one at its output with the outputs of the remaining NAND gates 121–124 remainnig at a logical zero. The DCD conversion of the decimal inputs is serialized in gates 125–129 through the strobing action of the digit timing pulses DCA–DCE. It will be seen that serialization of this BCD conversion is such that the parity bit P is first, followed by the most significant bit 8; the second most significant bit 4, the second least significant bit 2 and finally the least significant bit 1.

In order to enter the BCD encoded digits selected at the keyboard (not shown) for entry into either registers 72 or 102 (FIGURE 1A) the outputs from NAND gates 120–124 are also supplied as separate inputs to a NOR gate 135. It will be seen that the output of NOR gate 135 is a logical one for so long as its inputs are all logical zeroes. As soon as a key is depressed for entry of a digit one of the inputs to the NOR gate 135 will go to a logical one causing its output to go through a logical one to a logical zero transition. This transition is effective to trigger a monostable multivibrator KEI. The output KEI, termed keyboard entry initiate, goes immediately from a logical zero to a logical one, and after a predetermined delay, returns to a logical zero. This output KEI is supplied to the gated set input of a keyboard entry set flip-flop KES. When the input KEI goes from a logical one to a logical zero, the flip-flop KES sets. The set output KES enables the gated set input of a keyboard entry flip-flop KEC. At the next occurrence of a word clock pulse $WC_0$ the flip-flop KEC is set to enable a NAND gate 136. The other inputs to NAND gate 136 are $\overline{CEF}$ and the bit clock pulses BCD. The output of NAND gate 136 is inverted in an inverter 137 to provide shift pulses $SLC_0$ for the search register 72. The input $\overline{CEF}$ to NAND gate 136 developed by the search and output control circuit (FIGURE 1B) essentially designates that the entry from the keyboard is for the purposes of performing a search function.

It will be seen that the function of the circuit elements 135, KEI, KEF and KEC is to take care of the fact that keyboard entry is initiated at random and it is necessary to synchronize the actual entry of the binary coded decimal digit to a suitable time reference such as the word clock pulses $WC_0$. Thus, upon entry of each digit from the keyboard into the search register 72 (FIGURE 1B) the flip-flop KEC is set by a word clock pulse $WC_0$ thereby enabling NAND gate 136 to pass a total of five search register shift pulses $SLC_0$, one in response to each bit timing pulse BCD. At the end of the fifth such pulse, the flip-flop KEC is reset by the digit timing pulse DCE applied to the gated reset input thereof. During the generation of the five shift pulses $SLC_0$, the BCD encoded digit to be entered are serially entered into the search register 72 by the serializing action of the digit timing pulses DCA–DCE. As additional digits are entered from the keyboard, the operation of the keyboard entry circuit 68 repeats with the previously entered digits being shifted along as the newly entered digits arrive at the input of the search register 72.

NAND gates 140, 141 and 142 shown in FIGURE 7 function to develop shift pulses $DLC_0$ for the data register 102 both for entry therein from the keyboard and for the transfer of words therefrom to the output device 118 (FIGURE 1B). Thus, these gates are functionally part of the shift control circuit 104 (FIGURE 1B) and will be considered in detail later.

Figure 8:
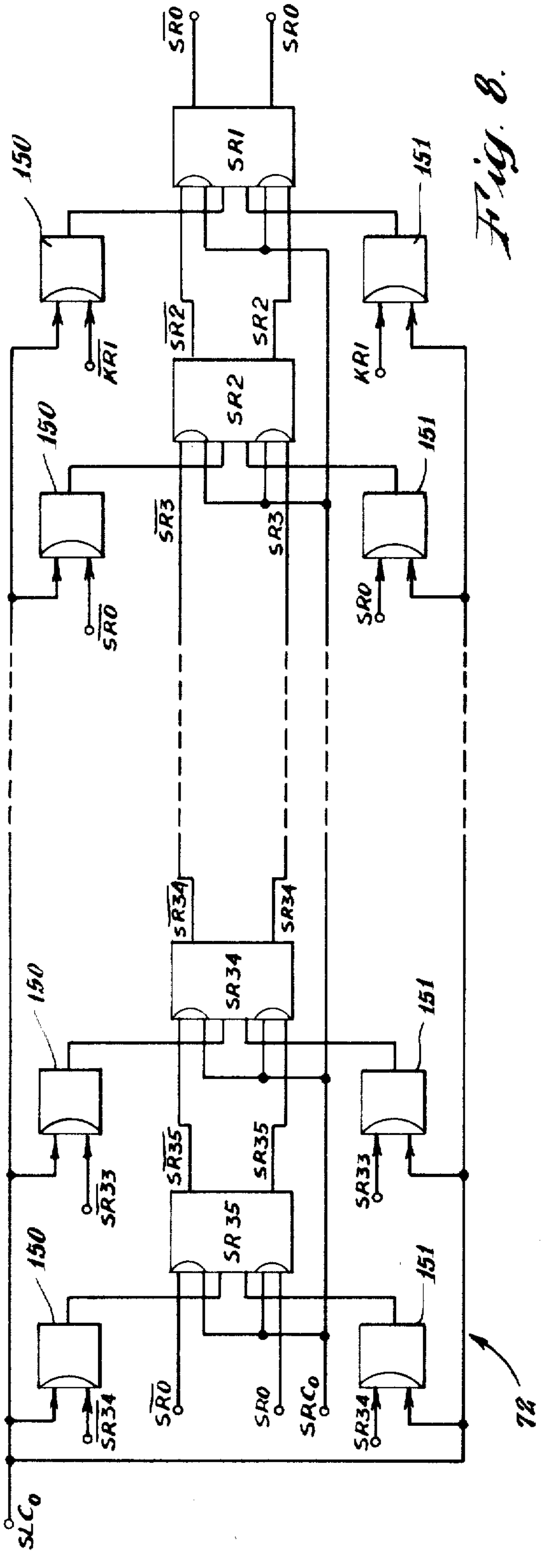
FIGURE 8 is an interrupted detail logic block diagram of the search register of FIGURE 1B.

*Search and data registers.*—The search register 72 is shown in detail in FIGURE 8. The search register 72 is made up of 35 flip-flop stages of which the first two, SR1 and SR2, and the last two SR34 and SR35, are specifically shown. With a total of thirty-five flip-flop stages, the search register 72 has a capacity to hold seven digits of five binary coded bits, i.e., a full word.

When the search register 72 is fully loaded from the keyboard entry circuit 68 (FIGURE 7), the flip-flop SR35 stores the parity bit of the most significant digit of the word while the flip-flop SR1 stores the least significant bit of the least significant digit of the word. Since normal keyboard entry is made most significant digit first, the search register 72 is loaded from the least significant end. A pair of A.C. gates 150 and 151 associated with each stage of the search register 72 have their D.C. enabling inputs (not shown) grounded. Therefore, all of the A.C. gates are permanently enabled. Each of the A.C. gates of search register 72 receives as one A.C. input the shift left clock pulses $SLC_0$ generated at the output of the inverter 137 (FIGURE 7) when digits are to be entered from the keyboard entry circuit 68. The A.C. gates 150 and 151 for stage SR1 receive as a second A.C. input the outputs $\overline{KRI}$ and KRI, respectively, from the keyboard entry circuit 68 (FIGURE 7). The A.C. gate 150, 151 receiving a logical one binary bit $\overline{KRI}$, KR1) from the keyboard entry circuit 68 passes a positive pulse to either the direct set or reset inputs of the stage SR1 when a shift left clock pulse $SLC_0$ goes through a logical one to zero (positive) transition. Thus, if the bit to be entered from the keyboard entry circuit 68 (FIGURE 7) is a logical one binary bit, the A.C. gate 151 passes a positive pulse to set the search register stage SR1 to its set condition thereby storing a binary one. Since at this time the input $\overline{KRI}$ to the A.C. gate 150 is a binary zero, no positive pulse will be passed to the direct reset input of the search register stage SR1.

Still referring to FIGURE 8, it is seen that the set and reset outputs SRO, $\overline{SRO}$ of search register stage SRI are applied to A.C. gates 150 and 151 whose outputs are connected to the direct reset and direct set inputs of search register stage SR2. Thus, the BCD encoded digits entered from the keyboard entry circuit 68 are shifted serially into the search register 72 and moved along to the left as seen in FIGURE 8. Thus, after seven digit entries the parity bit of the most significant digit is stored in search register stage SR35 while the least significant bit of the least significant digit is stored in search register stage SR1.

As generally described in connection with FIGURES 1A and 1B, during a search operation, the word held in the search register 72 is continuously recirculated. Accordingly, the output of the search register 72, SRO and $\overline{SRO}$ from stage SR1, is fed back to the gated set and gated reset inputs of the search register stage SR35. The set and reset outputs of search register stage SR35 are connected to the gated set and reset inputs of the search register stage SR34. Similarly, the set and reset outputs of search register stage SR34 are applied to the gated set and reset inputs of search register stage SR33 (not shown). Finally, the set and reset outputs of search register stage SR2 are connected to the gated set and reset inputs of search register stage SR1. The search and output control circuitry 90 disclosed generally in FIGURE 1B and described in detail below, operates during a search operation to generate shift right clock pulses $SRC_0$ which are applied to the gated set and reset inputs of all of the search register stages SR1–SR35. It is thus seen that during a search operation when the shift right clock pulses $SRC_0$ are generated, the contents of the search register 72 are shifted to the right and recirculated from the output of search register stage SR1 back to the input of search register stage SR35.

Figure 9:
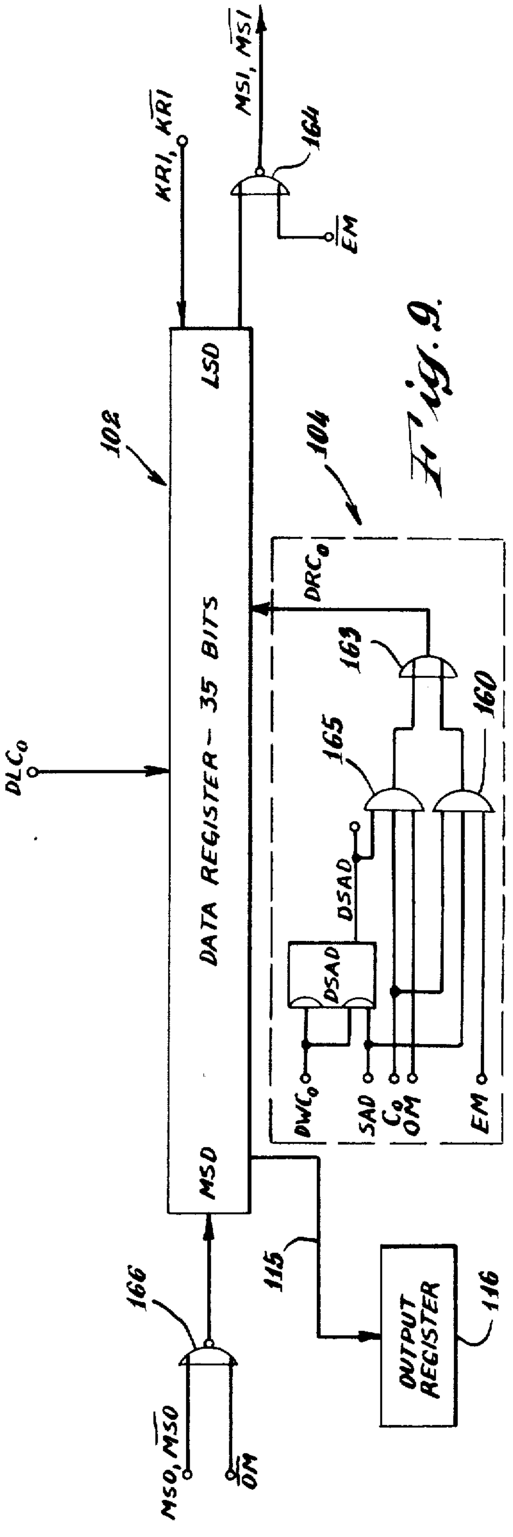
FIGURE 9 is a block diagram of the data register of FIGURE 1B and a logic block diagram of a portion of the shift control circuit of FIGURE 1B.

The data register 102 is shown generally in FIGURE 9. This data register is also a bidirectional 35 bit shift register preferably constructed in the same manner as the search register 72. The data register 102 is shifted left by data register shift left clock pulses $DLC_0$ generated by the circuitry of FIGURE 7 shown in conjunction with the keyboard entry unit 68 but functionally is part of the shift control circuit 104 (FIGURE 1B). Referring back to FIGURE 7, if it is desired to enter a word into the data register 102 for purposes of recording this word at a particular location on the magnetic drum 24, the keyboard entry circuit 68 is operated in precisely the same manner as described above for an entry into the search register 72. However, since a search function is not to be performed, the signal $\overline{CEF}$ from the search and output control circuit 90 (FIGURE 1B) disables NAND gate 136 while the signal CEF enables NAND gate 140. Thus, during the time that the flip-flop KEC is set, five data register shift left clock pulses $DLC_0$ are generated at the output of NAND gate 142. Since the outputs KRI and $\overline{KRI}$ from the keyboard entry encoder unit 68 are also applied to the data register 102, the binary coded decimal digits entered from the keyboard are shifted into the data register 102 from the least significant digit (LSD) end. Thus, upon completed entry of a word into the data register 102 from the keyboard entry 68, the individual binary bits of the word are held therein precisely in the same manner as they would be held if entry was made instead into search register 72.

As described generally in connection with FIGURES 1A and 1B, in order to enter a word from the data register into the main store (magnetic drum 24) the magnetic drum must be properly addressed in order that entry will be made at the proper location. In order to address the magnetic drum 24, a search operation must have been performed so as to derive the selected address signal SAD. The selected address signal SAD, once derived, is supplied as one input to an AND gate 160 (FIGURE 9). A second input to AND gate 160 is the bit clock pulses $C_0$. Mode signal, derived at the control panel 77, (FIGURE 1B) is applied as the third input to AND gate 160. Since we are now concerned with the entry mode, the control signal EM enables the AND gate 160. Then, during the time of the selected address signal SAD, AND gate 160 is fully enabled to develop data register shift right clomk pulses $DRC_0$ gated through an OR gate 163 for application to the individual stages of the data register 102. Consequently, the contents of the data register 102 are shifted to the right as seen in FIGURE 9. The binary bits leaving the least significant digit end of the data register 102 are gated through a NOR gate 164, when enabled by an enter mode signal $\overline{EM}$, to develop main store inputs MSI, $\overline{MSI}$ on line 112 for recording on the drum 24. Thus, the word is emptied from the data register and stored on the magnetic drum 24 in reverse order from that in which it was entered into the data register from the keyboard entry circuit 68.

The output mode is also carried out under the control of a selected address signal SAD as well as the track select circuitry 76. The data register 102 is loaded from the main store (magnetic drum 24) over the connection 83 from the synchronizer circuit 80 (FIGURE 1A). The output mode signal OM is generated at the control panel 74 in the console (FIGURE 1B). This control signal OM is used to gate the main store outputs MSO, $\overline{MSO}$ through a NOR gate 166 into the most significant digit (MSD) end of the data register 102. The control signal OM is also applied to an AND gate 165 so as to enable it for an output mode. The selected address signal SAD is suitably delayed by a flip-flop DSAD which is clocked by delayed word clock pulses $DWC_0$ generated by the circuitry of FIGURE 14. The delayed selected address signal DSAD is necessary because of inherent playback delay which is more fully explained in connection with FIGURE 13. Thus, during the time of the delayed selected address signal DSAD, AND gate 165 is fully enabled so as to generate data register shift right clock pulses $DRC_0$ through OR gate 163 effective to shift the main store outputs MSO, $\overline{MSO}$ into the data register 102 arriving at the most significant digit end. Since the word coming from the main store (magnetic drum) arrives least significant digit, least significant bit, it will be seen that the word once loaded into the data register 102 assumes the proper serial order such that it may be properly displayed at the data display unit 108 (FIGURE 1B).

A final function of the data register 102 is to read out the words from the main store (drum 24) into the data register 102 and transfer them digit by digit to the output register 116 (FIGURE 1B) for transmission to the output device 118. In a practical situation, the ouput device 118 may be a teletypewriter which interprets the first digit received as the most significant digit of a word. Thus, the data register 102 must be controlled so as to supply digits to the output register 118 in the order most significant digit to least significant digit. It will be seen that the digits of the words stored in the data register 102 must be shifted progressively to the left and transferred to the output register 116 from the five data register stages DR35–DR31 (not shown) comprising most significant digit position of the data register 102. This function can be again performed by the circuitry disclosed in FIGURE 7.

Referring now to FIGURE 7, the flip-flop KES can also be set by a next digit request signal NDR developed by the output device 118. As a result, the flip-flop KEC is triggered to its set condition by the next occurring word clock julse $WC_0$. NAND gate 141 is thus enabled by the set output KEC of flip-flop KEC. A control signal MOF generated at the search and output control circuit 90 (FIGURE 1B) fully enables NAND gate 141 such that data register shift left clock pulses $DLC_0$ are generated at the output of AND gate 142.

The output register 116 may be constructed in the manner specifically disclosed in the above-noted copending application, Ser. No. 437,781. Accordingly, the output register 116 is under the control of the output device 118 which generates a parallel transfer clock effective to transfer a digit contained in the last five stages of the data register 102 into the output register 116. Once this most significant digit is transferred to the output register 116, it is then transmitted to the output device 118. After this most significant digit of the full word held in data register 102 is printed out, the output device 118 generates a next digit request signal NDR which sets the flip-flop KES (FIGURE 7) to institute the generation of five data register shift left clock pulses $DCL_0$. Thus, the next most significant digit of the word in the data register 102 is shifted into the most significant digit position. Thereupon, it is transferred to the output register 116 by the next occurring parallel transfer clock. Once the data register 102 has been emptied by the successive transfer, digit by digit, of the word to the output register 116 and transmitted to the output device 118, another word is selected by operation of the track select circuitry 76, and the operation repeats.

Figure 10:
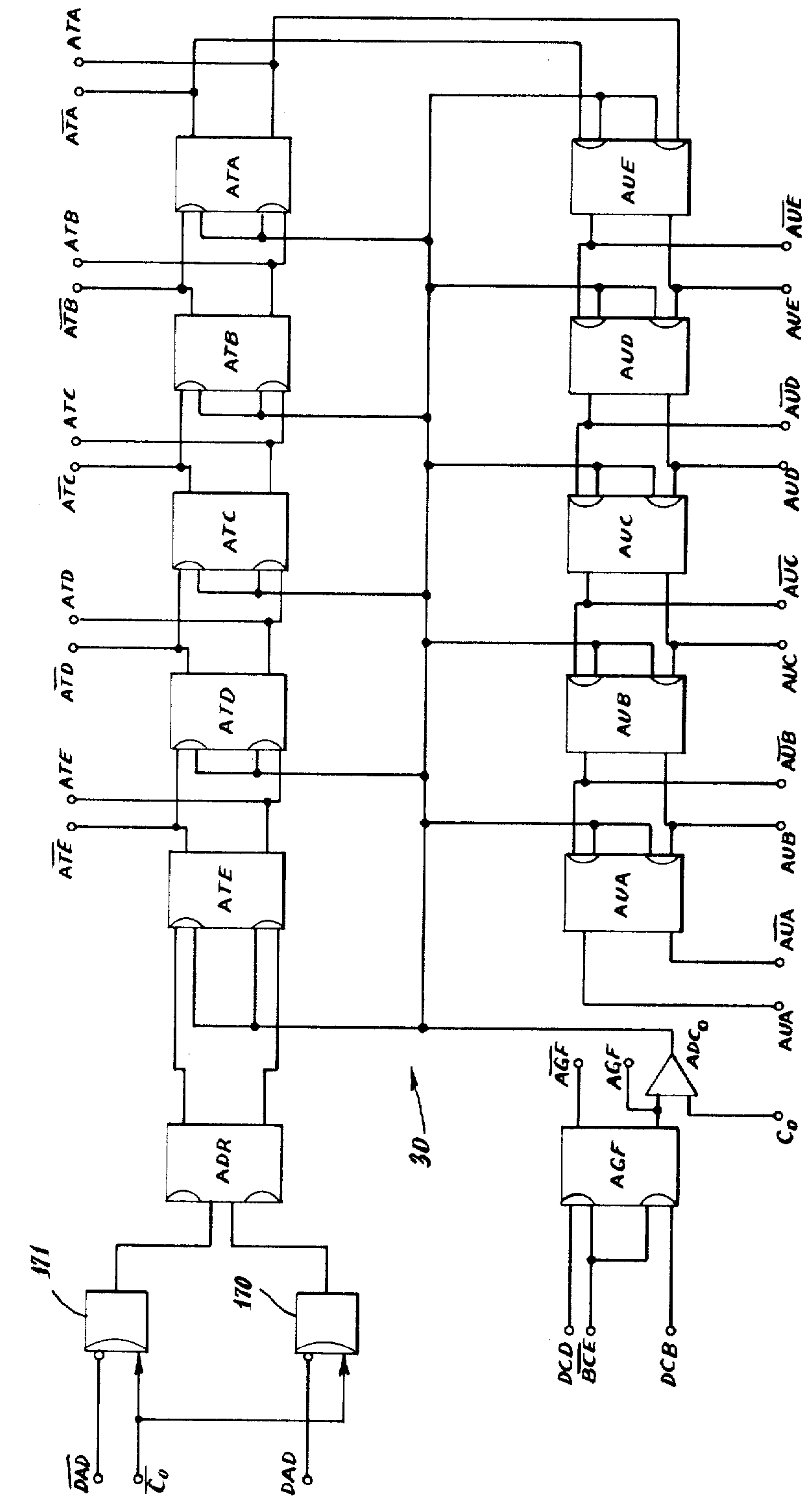
FIGURE 10 is a detailed logic block diagram of the address register of FIGURE 1B.

*Address registers.*—The address register 30 generally disclosed in FIGURE 1B is shown in detail in FIGURE 10. The address register 30 is substantially the same as the address register disclosed in the above-identified copending application except that in the former the parity bit of the address word digits are entered into the address register whereas in the latter, the parity bits are dropped.

Referring specifically to FIGURE 10, the address words, each typically consisting of two BCD encoded digits, are read from the drum address track 26, least significant digit, least signficant bit first and applied as enabling inputs DAD and $\overline{DAD}$ to A.C. gates 170 and 171, respectively. The individual binary bits of the address words are reclocked by bit clock pulses $\overline{C}_0$ applied to the A.C. inputs of A.C. gates 170 and 171. Thus, the address register input flip-flop ADR is set for each binary one bit of the address word and reset for each binary zero bit. The individual binary bits of the address words appearing successively at the set and reset outputs of the address input flip-flop ADR are entered serially into a shift register consisting of flip-flop stages ATE–ATA and AUE–AUA. In practice, as shown in the above-identified copending application, each digit of the address word may be checked for parity as the individual binary bits are developed at the outputs of the address input flip-flop ADR.

The shifting in of the address words into the shift register is controlled by an address gate flip-flop AGF. The operation of the address gate flip-flop AGF is clocked by digit timing signals DCB applied to its gated set input, digit timing signals DCD applied to its gated reset input, and bit timing signals $\overline{BCE}$ applied to both its gated set and reset inputs. In the present invention, the least significant digit of each address word is stored in the third digit slot and the most significant digit in the fourth digit slot of each word slot in the drum address track 26. The timing pulses applied to the inputs of the flip-flop AGF are such that this flip-flop is set during the third and fourth digit times of each address word time and reset at all other times. Thus, the address gate flip-flop AGF is set only during the time when the two digits of an address word may be read from the drum address track 26. The set output of the address gate flip-flop AGF is applied as one input to a gated amplifier 172.

The other input to the gated amplifier 172 is supplied by bit clock pulses $C_0$. It will thus be seen that address register shift pulses $ADC_0$ are generated during the third and fourth digit times of each address word so as to shift each address word into the shift register. When the shift register of the address register 30 is filled, flip-flop stage AUA contains the least significant bit of the least significant digit of the address word. Flip-flop stage ATE contains the parity bit of the most significant digit of the address word.

Figure 11:
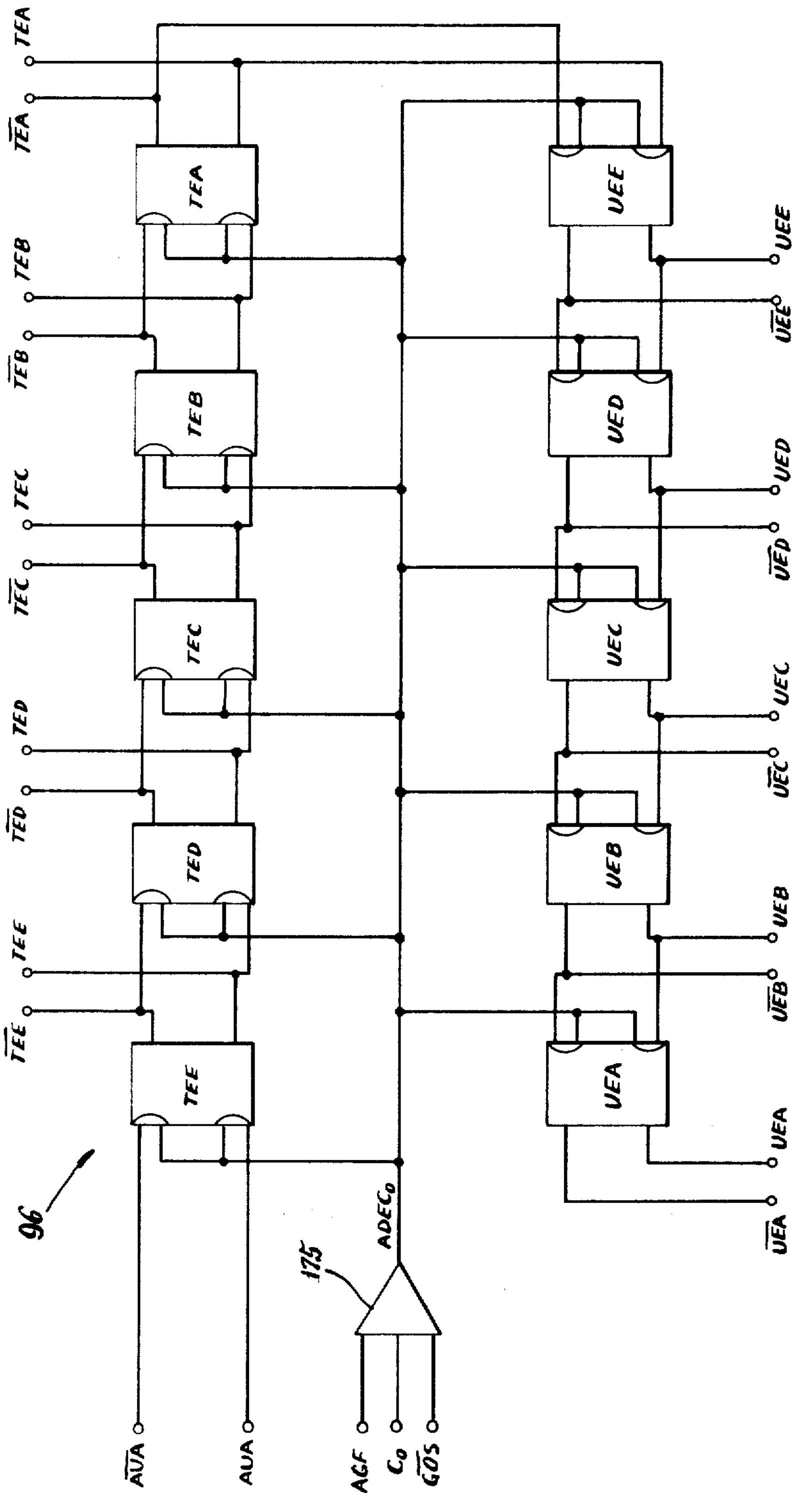
FIGURE 11 is a detailed logic block diagram of the address extension register of FIGURE 1B.

Referring now to FIGURE 11, the address extension register 96 is constructed quite similarly to the address register 30 in that it is made up of a shift register comprising flip-flop stages TEE-TEA and UEE-UEA. The output of the address register 30 (FIGURE 10) taken as AUA and $\overline{AUA}$ are applied to the gated set and gated reset inputs, respectively of the first flip-flop stage TEE of the address extension register 96. The operation of the shift register in the address extension register 96 is controlled by shift pulses $ADEC_0$ developed at the output of a gated amplifier 175. The inputs to the gated amplifier 175 are the set output AGF of the address gate flip-flop AGF (FIGURE 10), bit clock pulses $C_0$, and a signal $\overline{GOS}$ developed at the search and output control circuit 90 (FIGURE 1B).

Assuming that the signal $\overline{GOS}$ is enabling, it will be seen that address extension register shift pulses $ADEC_0$ are developed during the third and fourth digit times of each word time just as the address register clock pulses $ADC_0$ (FIGURE 10). Thus, an address word held in the address register 30 is entered into the address extension register 96 one word time later.

As will be seen from the description to follow, the signal $\overline{GOS}$ serves to inhibit the generation of shift pulses $ADEC_0$ when, after a successful search operation has been concluded, the address word corresponding to the located word is held in the address extension register 96.

Figure 12:
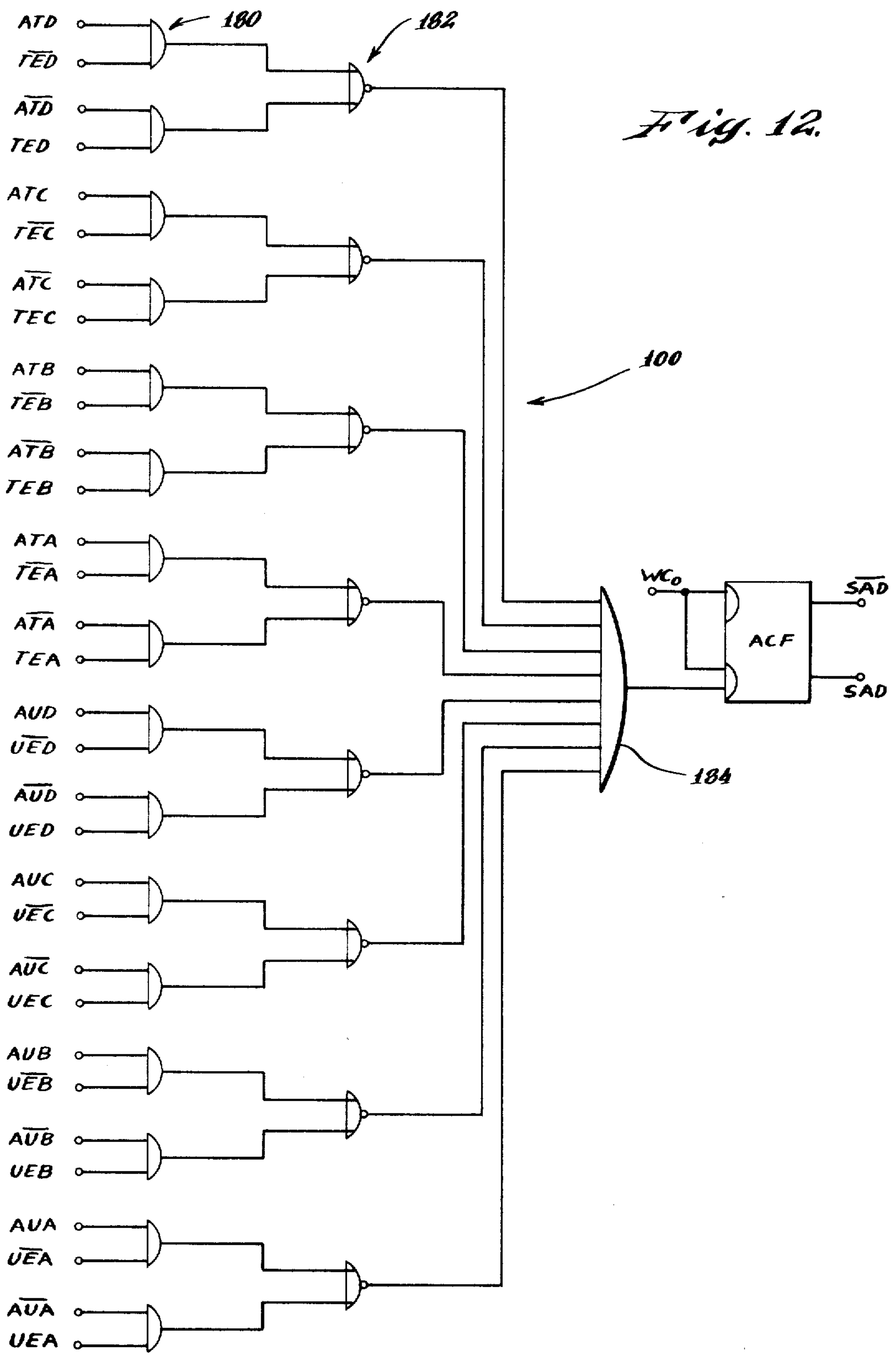
FIGURE 12 is a detailed logic block diagram of the address comparator of FIGURE 1B.

*Address comparator—SAD signal.*—The comparator 100 of FIGURE 1B is shown in detail in FIGURE 12. The set and reset outputs of each of the flip-flop stages of the address register 30 (FIGURE 10) and the address extension register 96 (FIGURE 11) are selectively gated together in an array 180 of AND gates whose outputs are, in turn, selectively gated together in an array 182 of NOR gates. The outputs of the NOR gates are applied as separate inputs to single AND gate 184.

It will be seen from FIGURE 12 that the output of AND gate 184 is a logical one only when the same address word is stored in each of the address registers 30 and 96. The output of AND gate 184 is supplied to the gated set input of an address comparison flip-flop ACF. Word clock pulses $WC_0$ are applied to both the gated set and reset inputs of the address comparison flip-flop ACF. Thus, when comparison is achieved between the contents of the address registers 30 and 96, the output of AND gate 184 goes to logical one and the address comparison flip-flop ACF will be set by the next occurring word clock pulse $WC_0$. The set output of the address comparison flip-flop ACF, when a logical one, constitutes the selected address signal SAD. By the time of the next word clock pulse $WC_0$ the logical one condition at the output of AND gate 184 will have disappeared since the next address word appears in register 30, and the address comparison flip-flop ACF is reset, terminating the selected address signal SAD.

Reflecting briefly on the system operation generally described in connection with FIGURES 1A and 1B, it will be recalled that when, after a successful search operation, a selected data word has been located in a particular track on the magnetic drum 24, the search and output control circuit 70 operates to disable further shifting of the address extension register 96 by virtue of the signal $\overline{GOS}$ (FIGURE 11). Inasmuch as the address words are read out from the drum 24 one word time in advance of the time when an associated static or dynamic data word can be read out from the drum, it will be seen that the associated address word is being shifted into the address extension register 96 from the address register 30 during the time when associated static and dynamic data words may be read from the magnetic drum 24. Thus, after a data word has been compared with a selected word, recirculating in the search register 72, in search comparator 86, the search and output control circuit 90 operates in response to the signal COM to immediately disable the address extension register 96. Thus, the address word associated with the located data word becomes locked in the address extension register 96. On each successive cycle of the magnetic drum 24, the address word corresponding to the address word held in the address extension register will be read into the address register 30 during the word time preceding the word time when the associated data words become accessible. At the end of the four digit time the contents of the address registers 30 and 96 will be identical and the output of the AND gate 184 (FIGURE 12) will enable the address comparison flip-flop ACF to be set by the next occurring word clock pulse $WC_0$. The selected address signal SAD is thus developed exactly during the word time of each cycle of the magnetic drum 24 during which data associated with the located data word becomes accessible.

It will be appreciated that the address comparator 100 could be constructed as a serial binary bit comparator rather than as the parallel binary bit comparator shown in FIGURE 12. A serial address comparator could be constructed in the manner of data comparator 86. The address word associated with the data word located in a search operation would be continuously recirculated in an address extension register and the recirculated address word compared binary bit by binary bit with the address words read from the drum address track 26.

Figure 13:
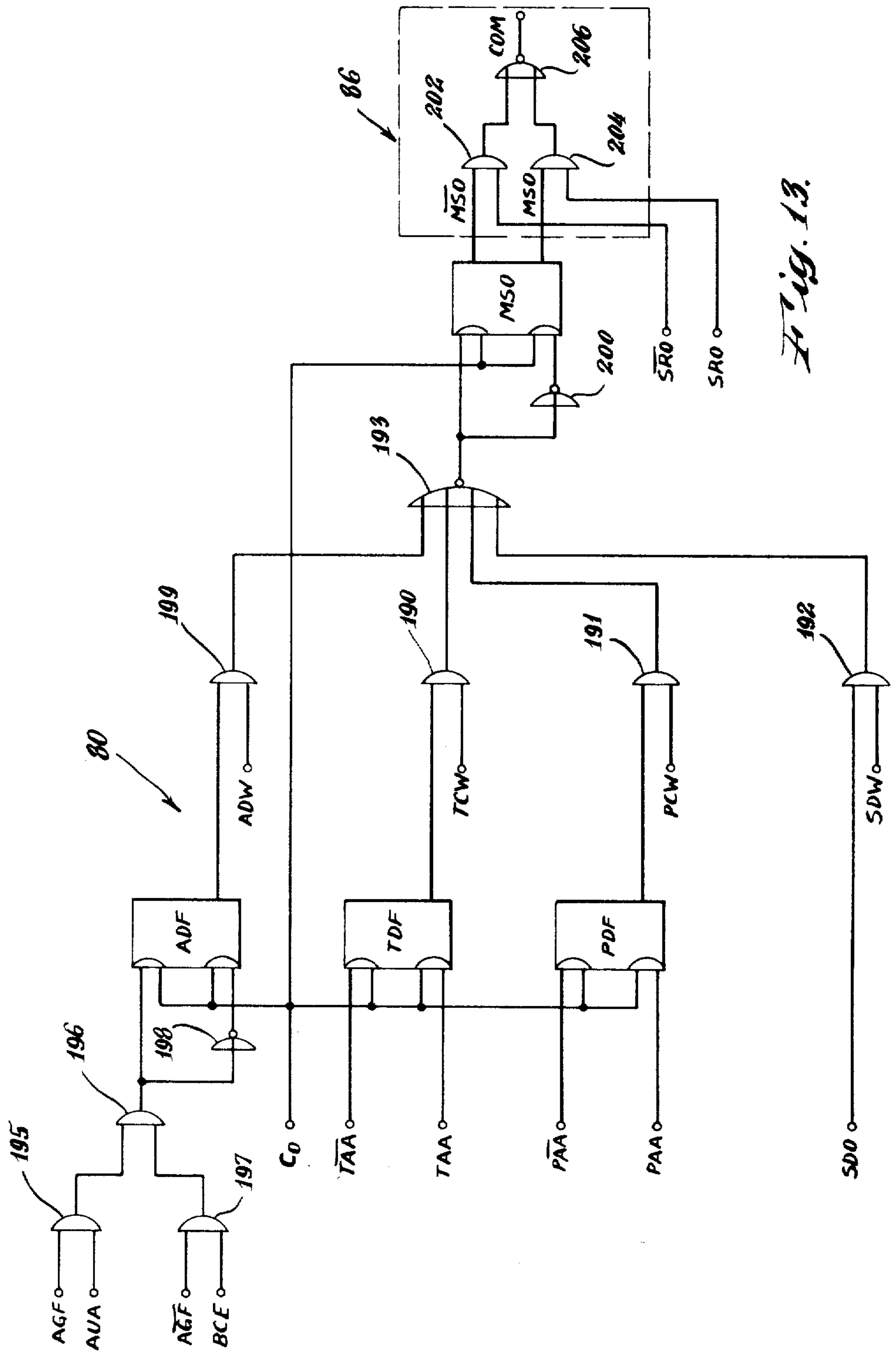
FIGURE 13 is a detailed logic block diagram of the static/dynamic data synchronizer and data comparator of FIGURES 1A and 1B.

*Static/dynamic data synchronizer 80 and data comparator 86.*—The static/dynamic data synchronizer 80 and the data compartor 86 of FIGURES 1A and 1B are shown in detail in FIGURE 13. The static/dynamic data synchronizer circuit portion of FIGURE 13 is quite similar in construction and philosophy to the similarly designated circuit disclosed in the above-noted copending application. Basically, the purpose of the static/dynamic data synchronizer 80 is to time align the various types of data words read from the magnetic drum 24. This becomes necessary because of the inherent playback delay encountered in the dual purpose read/write heads 61, 62 and 63 operating in the static data tracks. Since the static data words read from the magnetic drum arrive at the static-dynamic synchronizer 80 slightly later in time than the associated dynamic data words, the most practical way in which to achieve time alignment or synchronization to delay dynamic data words by an appropriate amount.

It is because of this playback delay that the selected address signal SAD must be delayed as shown in FIGURE 9. The delayed selected address signal DSAD defines the time during each drum cycle when a selected data word appears as a main store output MSO. Thus, a selected data word is recorded on the drum during the time of the selected address signal SAD and the same data word is available in subsequent drum cycles as a main store output MSO during the time of the corresponding delayed selected address signal DSAD. It is for this reason that a data word is read out of the data register 102 for recording on the drum 24 during the SAD signal time and a data word is read into the data register from the drum during the DSAD signal time.

Accordingly, the time count words read from the time count track section 50 into the time count logic circuitry 48 from which they are applied as inputs TAA and $\overline{TAA}$ to a time count delay flip-flop TDF located in the static/dynamic data synchronizer circuit 80. The exact origin of the time count words inputs TAA and $\overline{TAA}$ supplied to the synchronizer circuit 80 may be seen from the above-noted copending application wherein the time count logic circuitry is disclosed in detail. Similarly, the piece count words read from the piece count track section 40 into the piece count logic circuitry 38 are supplied as inputs TAA and $\overline{TAA}$ to a piece count delay flip-flop PDF.

The set outputs of the time count delay flip-flop TDF and the piece count delay flip-flop PDF are separately gated in AND gates 190 and 191 with appropriate track select (word select) signals TCW and PCN developed by the track select circuitry 76 (FIGURE 1B). The static data word output SDO is gated with a static data word select signal SWD in an AND gate 192. As recalled from a discussion of the general operation of the system, the actual selection of the particular static data word track, whether employee number track 60, job number track 62, or machine number track 64, is effected at the read/write gated amplifier 66 by the track select circuitry 76 (FIGURES 1A and 1B). The select signal SDW merely indicates to the static/dynamic data synchronizer 80 that a static data word is to be gated through the synchronizer circuit to the input of the data register 102 (FIGURES 1B and 9). The outputs of AND gates 190 through 192 are applied as separate inputs to a NOR gate 193.

Since in some cases it may be desired by the customer to also have the capability of searching for address words, the set output of flip-flop stage AUA, the last stage in the address register 30 (FIGURE 10), is gated with the set output of the address gate flip-flop AGF in an AND gate 195. The output of AND gate 195 is applied as one input to an AND gate 196. The reset output of the address gate flip-flop AGF (FIGURE 10) is gated with the bit timing signals BCE in an AND gate 197 whose output is applied as the second input to AND gate 196. The output of AND gate 196 is, in turn, applied to the gated reset input and through an inverter 198 to the gated set input of an address delay flip-flop ADF. The set output of address delay flip-flop ADF is gated with an address word select signal ADW supplied from the track select circuitry 76 (FIGURE 1B) in an AND gate 199. The output of AND gate 199 is supplied as the fourth input to NOR gate 193.

Still referring to FIGURE 13, the output of NOR gate 193 is then applied to the gated reset input and, through an inverter 200, to the gated set input of a main store output flip-flop MSO. The set output MSO and reset outputs $\overline{MSO}$ of the main store output flip-flop MSO are gated with the corresponding outputs SRO and $\overline{SRO}$ in a pair of AND gates 202 and 204. The outputs of AND gates 202 and 204 are gated together in a NOR gate 206. AND gates 202, 204 and NOR gate 206 comprise the serial comparator 86 (FIGURE 1B). The output of the comparator is the signal COM.

It will be readily apparent from the logic circuitry of the comparator 86, that as long as there is exact bit by bit comparison of the data word being generated at the outputs of the main store output flip-flop MSO and the data word being recirculated in the search register 72, the comparator output COM remains at a logical zero. Should there be a non-comparison between corresponding binary bits of the two words, the output signal COM goes to a logical one. The effect of the comparator output signal COM on the system operation becomes apparent from the detailed description of search and output control circuit 90 (FIGURE 1B) below.

It will be recalled that the address word, as stored on the drum address track 26, is comprised of two digits in the disclosed embodiment of the invention, the least significant digit occupying the third digit slot and the most significant digit occupying the fourth digit of each word slot. Accordingly, in order to effectively search for an address word, the search register 72 must be loaded such that the least significant digit of the address word is located in the third digit position and the most significant digit located in the fourth digit position. All other digit positions of the search register 72 are loaded as binary coded decimal zeroes.

Now referring to FIGURE 13, AND gate 195 serves to gate the digits of the address words to the main store output flip-flop MSO during the third and fourth digit times as controlled by the set output of address gate flip-flop AGF. During all other digit times, AND gate 197 is enabled during the fifth bit time (parity bit time) such that the main store output flip-flop MSO will generate a decimal zero complete with an odd parity bit. It will thus be seen that, not only are the actual digits of the address word compared in the comparator 86, but also the remaining nonsignificant digits. This renders the same comparator 86 capable of comparing both address words and data words during the performance of a search operation. As will be seen from the detailed description of the search and output control circuits 90, below, comparison must be achieved for every binary bit of a word in order for the comparator output signal COM to indicate to the search and output control circuitry that comparison, and thus the location of a selected word has indeed been achieved.

Figure 14:
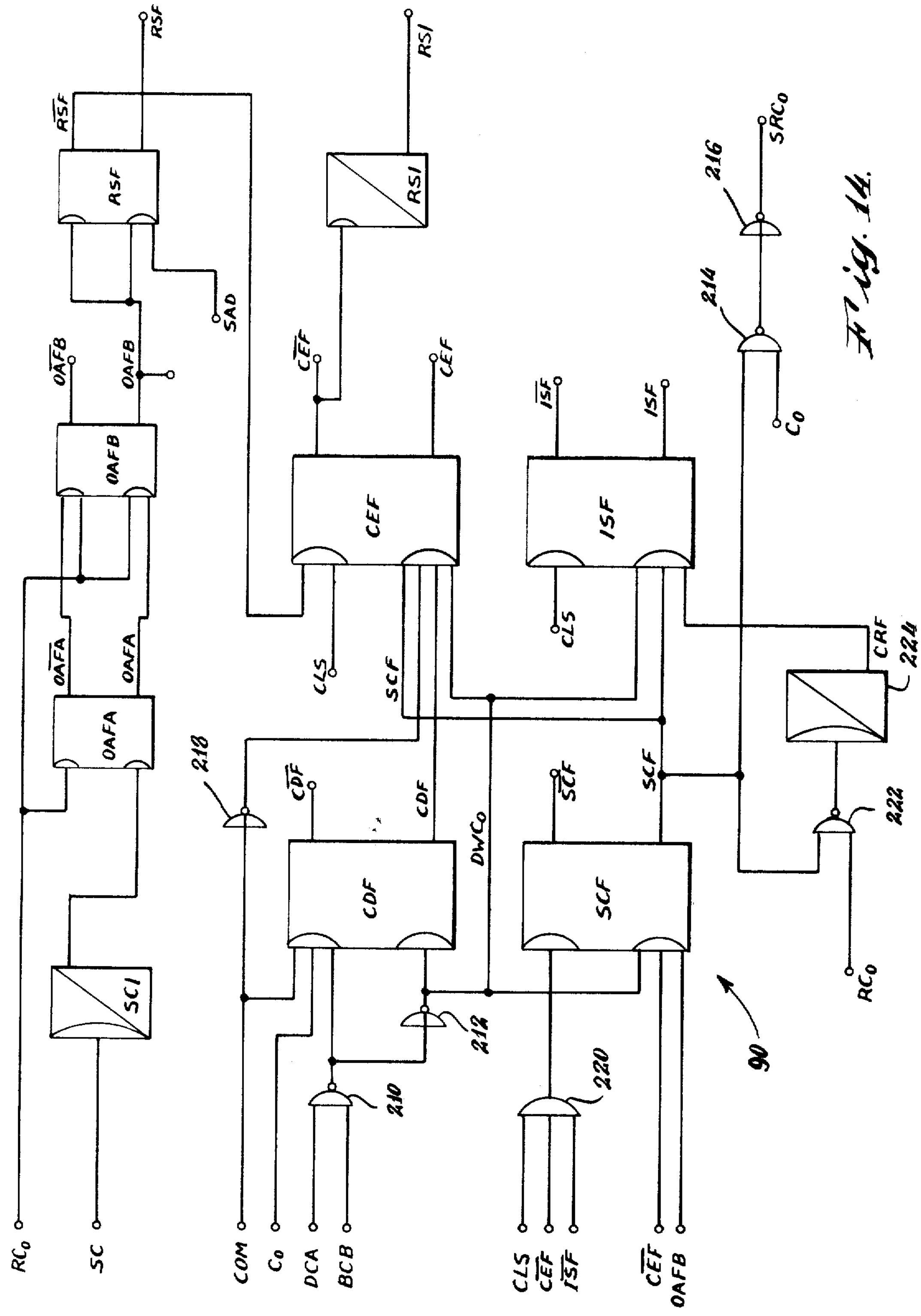
FIGURES 14 and 15 are detailed logic block diagrams of the search and output control circuit of FIGURE 1B.
Figure 15:
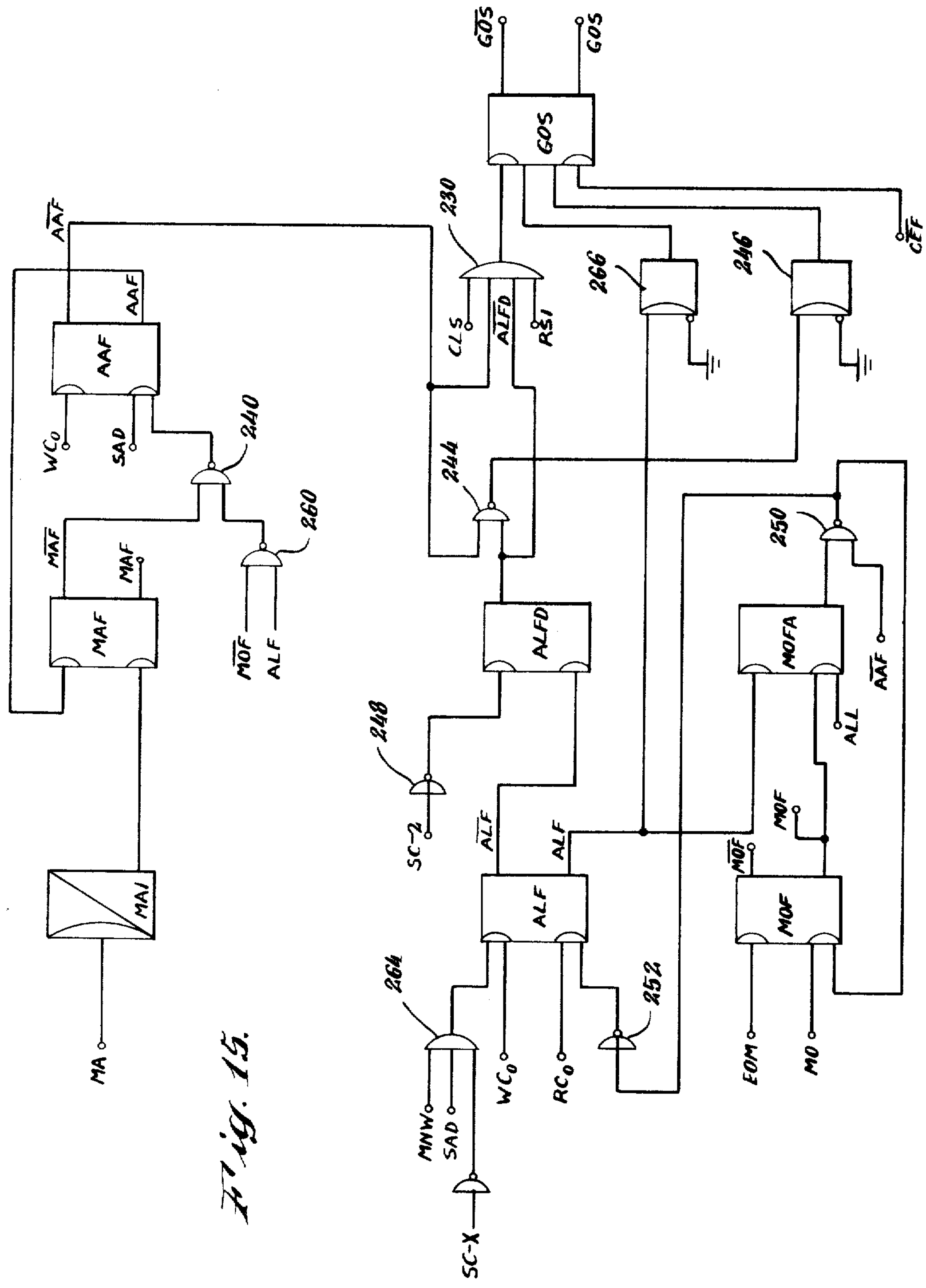

*Search and output control circuit 90.*—The search and output control circuit 90 is shown in detail in FIGURES 14 and 15. Referring first to FIGURE 14, after a selected data word has been entered into the search register 72, and the track select circuitry 76 has been conditioned to select the data track on the magnetic drum 24 in which are recorded words of the same nature, a search command signal SC is sent from the control panel 74 at the console 70 to the search and output control circuitry 90. This search command signal SC triggers a delay multivibrator, termed search command initiate, SCI. The multivibrator SCI goes to its unstable state and upon return to its stable state sets flip flop OAFA. The set output of flip flop OAFA conditions a flip flop OAFB to be set by the next occurring revolution clock pulse $RC_0$ occurring at the beginning of each interrogation cycle. It is understood that the pulse $RC_0$ marks the beginning of each system or interrogation cycle and not the beginning of each drum spin when more than 100 machine stations 20 are involved. The same revolution clock pulse $RC_0$, which sets the flip flop OAFB, resets the flip flop OAFA. At the beginning of the next interrogation cycle the revolution clock pulse $RC_0$ resets the flip flop OAFB. It will thus be seen, that the flip flop OAFB is set for a complete interrogation cycle in response to the randomly generated search command signal SC.

Still referring to FIGURE 14, the set output OAFB of the flip flop OAFB, which is a logical one for a complete interrogation cycle, is applied to the gated set input of a search control flip flop SCF. The reset output $\overline{CEF}$ of a coincidence established flip flop CEF is also applied to the gated set input of the search control flip flop SCF. As will be seen from the description to follow, the coincidence established flip flop CEF is reset and therefore, its reset output $\overline{CEF}$ is a logical one during a search operation until the selected word is located in the main store (drum 24).

Digit timing signals DCA and bit timing signals BCB are gated together in a NAND gate 210. The output of NAND gate 210 is applied directly to the gated reset input of a coincidence detector flip flop CDF and through an inverter 212 to the gated set input of the coincidence detector flip flop. The outputs from inverter 212 are in actuality delayed word clock pulses, termed $DWC_0$, which are aligned with the data words gated through and appearing at the output of the static/dynamic data synchronizer 80. These delayed word clock pulses $DWC_0$ maintain the coincidence detector flip flop in its set condition, and the first one occurring after the flip flop OAFB is set is effective to set the search control flip flop SCF. The set output SCF of the search control flip flop SCF is gated with bit clock pulses $C_0$ in a NAND gate 214. The output of NAND gate 214, after inversion in an inverter 216, supplies shift right clock pulses $SRC_0$ to the search register 72 for so long as the search control flip flop SCF is set. It will thus be seen that the recirculation of the selected word in the search register 72 is synchronized with the data words to be searched appearing as outputs MSO, $\overline{MSO}$ from the static/dynamic synchronizer 80.

As previously described, the selected word recirculated in the search register 72 is compared bit by bit with each data word appearing at the output of the synchronizer 80 in the serial comparator 86. As long as binary bit by bit comparison is achieved, the output COM from the serial comparator 86 remains a logical zero as seen in FIGURE 13. The comparator output signal COM is applied to the gated reset input of the coincidence detector flip flop CDF together with bit clock pulses $C_0$ (FIGURE 14). The serial comparator output signal COM is also applied to the gated set input of the coincidence established flip flop CEF through an inverter 218. The gated set input of the coincidence established flip flop also receives the set output SCF of the search control flip flop SCF, the set output CDF of the coincidence detector flip flop CDF, and delayed word clock pulses $DWC_0$.

The operation of the portion of the search and output control circuit 90 thus far described is as follows. At the very beginning of a search operation, the coincidence detector flip flop SDF and the search control flip flop SCF are set by a delayed word clock pulse $DWC_0$. At this time, the coincidence established flip flop CEF is in a reset condition, having been reset by a clear signal CLS generated at the control panel 74 at the conclusion of a previous search operation. Shift right clock pulses $SRC_0$ are generated to continuously recirculate selected words in the search register 72. The recirculated word is compared bit by bit with each word appearing as outputs MSO, $\overline{MSO}$ from the synchronizer 80 in the serial comparator 86. For as long as bit by bit comparison is achieved, the comparator output signal COM remains a logical zero. As soon as a non-comparison between bits in corresponding bit positions of the words is detected, the comparator output signal COM goes to a logical one and the coincidence detector flip flop CDF is reset by a bit clock pulse $C_0$. The coincidence detector flip flop CDF is set at the beginning of each word comparison.

At the end of each word comparison designated by the occurrence of a delayed word clock pulse $DWC_0$ the state of the coincidence detector flip flop CDF as well as the condition of the comparator output signal COM are sensed by the coincidence established flip flop CEF. If the coincidence detector flip flop CDF was reset at any time during word comparison, its set output CDF goes to a logical zero and the coincidence established flip flop CEF may not be set by a delayed word clock pulse $DWC_0$. On the other hand, if the coincidence detector flip flop CDF was not reset during a word comparison, and the comparator output signal COM inverted to a logical one continues to indicate comparison at the occurrence of a delayed word clock pulse $CWC_0$, the coincidence established flip flop CEF is set indicating that the selected word has been located. The setting of the coincidence established flip flop CDF causes the search control flip flop SCF to be reset through an AND gate 220, discontinuing the search operation.

If after a complete operating cycle of the magnetic drum 24 comparison is not achieved between the data word recirculated in the search register 72 and any of the data words appearing at the output of the synchronizer 80, an incorrect search flip flop ISF is set indicating that the selected word cannot be located. This is achieved by feeding delayed word clock pulses $DWC_0$ and the set output of search control flip flop SCF to the gated set input of the incorrect search flip flop ISF. The set output SCF of the search control flip flop SCF is also gated with the revolution clock pulse $RC_0$ in a NAND gate 222. The output of NAND gate 222 triggers delay multivibrator 224, which in response supplies a logical one output pulse as the third gated input to the incorrect search flip flop ISF. This logical one output pulse developed by the delay multivibrator 224 is designed to compensate for the fact that a search operation is started somewhat after the occurrence of a revolution marker pulse $RC_0$ and thus the search operation is concluded somewhat after the occurrence of the next revolution clock pulse $RC_0$. It will be recalled that this situation is necessitated by the time alignment function performed in the synchronizer circuit 80.

During the performance of a search operation the output CRF of the delay multivibrator 224 is a logical zero thus preventing the incorrect search flip flop ISF from being set by a delayed word clock pulse $DW_0$. If a selected word is located during a search operation, the seach control flip flop SCF is reset, the coincidence established flip flop CEF sets and the gated set input of the incorrect search flip flop ISF is disabled. However, if at the termination of a search operation the selected word has not been located, the search control flip flop SCF remains set. In response to the occurrence of a revolution marker pulse $RC_0$ just prior to the termination of a search operation, the multivibrator 224 is triggered and its output CRF temporarily goes to a logical one so as to fully enable the gated set input of the incorrect search flip flop ISF. On the occurrence of the next delayed word clock pulse $DWC_0$, which is slightly delayed from the occurrence of the revolution marker pulse $RC_0$, the incorrect search flip flop ISF is set. The set output ISF of the incorrect search flip flop ISF may be used to energize a signal lamp at the console indicating that the selected word cannot be located in the main store (magnetic drum). As soon as the incorrect search flip flop is set, its reset output $\overline{ISF}$ is used to reset the search control flip flop SCF through AND gate 220. As in the case of the coincidence established flip flop CEF, the search control flip flop and the incorrect search flip flop ISF may be reset by a clear signal CLS generated at the console.

Referring for the moment to FIGURE 15, the reset output $\overline{CEF}$ of the coincidence established flip flop CEF (FIGURE 14) is applied to the gated set input of a flip flop GOS. It will be recalled that the reset output $\overline{GOS}$ of flip flop GOS is used in the address extension register 96 (FIGURE 11) in gating the application of shift pulses $ADEC_0$ employed to shift the address words through the address extension register. The flip flop GOS is normally reset by a clear signal CLS applied to its gated set gated reset input through an AND gate 230. Consequently, its reset output $\overline{GSO}$ is a logical one to enable the generation of address extension pulses $ADEC_0$. When a selected word has been located during a search operation, the coincidence established flip flop CEF is set and its reset output $\overline{CEF}$ causes the flip flop GOS (FIGURE 15) to be set. This terminates the generation of address extension register shift pulses $ADEC_0$ (FIGURE 11) and the address associated with the located data word is retained in the address extension register 96. On successive cycles of the magnetic drum 24, when the associated address word is read from the drum into the address register 30, comparison will be achieved with the same address word locked in the address extension register 96 giving rise to the selected address signal SAD at the output of comparator 100. Thus, the data words associated with the located data words are commonly addressed by the selected address signal SAD.

In some situations, particularly when the selected word to be searched is a job number, it is desirable to perform a repeat search operation. It will be appreciated that, in practice, there may be a plurality of machine stations working on the same job. Thus, the same job number word will be stored in a plurality of word locations on the job number track 62 in association with a plurality of machine stations 20. When performing a search operation on the basis of a selected job number, it will be appreciated that coincidence will be detected with the first comparable job number read from the job number track 62. In order to locate the same job number associated with other machine stations, a repeat search function is instituted.

Again, a search command signal SC is generated at the console. The search command initiate multivibrator SCI is triggered to set the flip flop OAFA. The flip flop OAFB is enabled such that it will be set by the next occurring revolution clock pulse $RC_0$. Since a normal search function must precede a repeat search function, a selected address signal SAD is being developed at the output of the comparator 100. This selected address signal SAD is applied together with the set output OAFB from the flip flop OAFB to the gated set input of a repeat search flip flop RSF. It will thus be seen that repeat search flip flop RSF is set when the selected address signal SAD disappears (goes from a logical one to a logical zero). The reset output $\overline{RSF}$ of the repeat search flop flop RSF drives the coincidence established flip flop CEF to its reset condition. The reset output $\overline{CEF}$ of the coincidence established flip flop CEF, in turn, enables the gated set input of the search control flip flop SCF such that it is set by the next occurring delayed word clock pulse $DWC_0$. It will thus be seen, that the repeat search operation is then carried out from the point when the normal search operation was terminated upon the location of the first comparable job number read from the job number track 62. This repeat search operation may be performed a number of times, each time searching for job numbers read out from the drum 24 after the previously located job number word is read out in a normal operating cycle of the main store (magnetic drum).

For each repeat search operation, it will be appreciated that it is necessary to develop a new selected address signal SAD associated with the newly located data word. Accordingly, the reset output $\overline{CEF}$ of the coincidence established flip flop CEF is used to trigger a repeat search initiate delay multivibrator RSI when the coincidence established flip flop is reset by operation of the repeat search flip flop RSF. The output RSI of the repeat search initiate multivibrator RSI is used to reset the flip flop GOS through AND gate 230 (FIGURE 15). Address extension register shift pulses $ADEC_0$ are gated through the gated amplifier 175 (FIGURE 11) to begin shifting new address words through the address extension register 96. When the next job number, for example, is located and the coincidence established flip flop CEF is set, terminating a repeat search operation, the flip flop GOS (FIGURE 15) is set by the reset output $\overline{CEF}$ of the coincidence established flip flop CEF and the address word associated with the newly located data word is locked in the address extension register 96. On successive revolutions of the main store, the selected address signal SAD associated with the newly located address word is successively generated at the output of comparator 100.

In some situations, either for the purpose of displaying data words by the console display 108 (FIGURE 1B) or to transmit data words to the output device 118 (FIGURE 1B), it may be desired to manually sequence through a number of machine stations 20. This manual advance or sequencing operation is carried out on the basis of the order or sequence in which the machine stations are interrogated in the normal automatic monitoring process rather than on the basis of a search operation. However, as will be seen in FIGURE 15, a search operation must be performed initially in order to develop a selected address signal SAD which is used as a reference point from which to begin sequencing through the machine stations 20 in order to monitor the stored data associated therewith.

Referring now to FIGURE 15, a manual advance signal MA, generated at the console control 74 (FIGURE 1B), triggers a manual advance initiate multivibrator MAI. The output of the multivibrator MAI sets a manual advance flip flop MAF. The reset output $\overline{MAF}$ of the manual advance flip flop MAF is gated through a NAND gate 240 to the gated set input of an address advance flip flop AAF. Since a prerequisite to the performance of a manual advance function is the performance of a search operation, the selected address signal SAD appearing at the output of the comparator 100 (FIGURE 1D) is also applied to the gated set input of the address advance flip flop AAF. When the manual advance flip flop MAF is in its set condition, the address advance flip flop AAF is set upon the termination of the selected address signal SAD. After being set, the address advance flip flop AAF is reset one word time later by a word clock pulse $WC_0$ applied to its gated reset input. The resetting of the address advance flip flop AAF serves also to reset the manual advance flip flop MAF. It will thus be seen that the address advance flip flop is in its set condition for one full word time after the appearance of a selected address signal SAD.

The reset output $\overline{AAF}$ from the address advance flip flop AAF is gated through a NAND gate 244 to the A.C. input of an A.C. gate 246. The output of the A.C. gate 244 is applied to the direct set input of the flip flop GOS. Thus, when the address advance flip flop AAF is set after the termination of a selected address signal SAD, the reset output $\overline{AAF}$ is effective to reset the flip flop GOS through AND gate 230. When the address advance flip flop AAF is reset one word time later, its reset output $\overline{AAF}$ is effected by way of gates 244 and 246 to trigger the flip flop GOS to its set condition. It will thus be seen that the flip flop GOS is reset for a full word time immediately following the termination of a selected address signal so as to enable the next address word to be shifted into the address extension register 96 (FIGURE 11). Each time the manual advance signal MA is generated at the console control panel 74 (FIGURE 1B), the above described operation repeats to automatically shift in the next address word into the address extension register 96, and a new selected address will be generated on successive operating cycles of the main store.

The main portion of the logic circuitry of the search and output control 90 shown in FIGURE 15 is devoted to the performance of an automatic address advance function or all function. This operation or function is typically performed when it is desired to read out all of the static/dynamic data stored on the magnetic drum 24, collate the data into messages and transmit the messages to the output device 118 for printout. Such an operation is typically performed at the end of a work shift, for example. The system of the present invention also has the capability of reading out the static and dynamic data associated with a single selected machine station 50, collating the data into a message and transmitting the message to the output device 118. It will be appreciated that message output on an individual basis is performed under the control of a selected address signal SAD developed at the conclusion of a successful search duration.

Now referring specifically to FIGURE 15, a message output command signal MO developed at the console control panel 74 (FIGURE 1B) is supplied to the gated set input of a message output flip flop MOF, triggering this flip flop to set condition. The track select circuitry 76 is signalled from the console control panel 74 (FIGURE 1B) to select the appropriate one of the drum data tracks for readout fo the first word of a message to be loaded into the data register 102. For message output on a selected individual machine station basis, a search function is performed in order to derive a selected address signal SAD for properly addressing the drum 24. The first word of the message to be outputted is then loaded into the data register 102 under the control of the selected address signal SAD. Referring back momentarily to FIGURE 7, the set output MOF of the message output flip flop MOF is applied to enable NAND gate 141. After the first digit of the first word of a message has been transferred to the output register 116 from where it is transmitted to the output device 118 for printout, the output device generates a next digit request signal NDR which is applied to the gated set input of the flip flop KES. Flip flop KES sets to in turn set flip flop KEC, whereupon five shift left pulses DLC are supplied to the data register 102 for shifting the second most significant digit of the word in the data register to the most significant digit position for transfer to the output buffer 116 from where it is transmitted to the output device 118 for printout. This operation continues under the control of the output device 118 until the data register has been completely emptied and the entire word transmitted to the output device 118. The track select circuit 76 (FIGURE 1B) automatically operates to select the second word of a message for loading into the data register 102. The above described operation is then repeated until this word is emptied from the date register 102 and transmitted to the output device 118. After a complete message has been printed out, the output device 118 transmits an end-of-message signal EOM which is employed to reset the message output flip flop MOF (FIGURE 15). The construction of the track select circuitry 76 enabling it to operate automatically in selecting the words in proper message order for loading into the data register 102 is preferably as disclosed in the above-noted copending application Serial No. 437,781.

In order to institute an automatic address advance during which the entire contents of the main store (magnetic drum) is collated and printed out as complete messages, a message output signal MO is again generated at the console control panel 74. The message output flip flop MOF is again set and its set output MOF is applied to the gated set input of a flip flop MOFA. An all function button (not shown) is depressed at the console control panel 74 to generate an all signal ALL, effective to set the flip flop MOFA. With the flip flop MOFA set, its set output MOFA supplied through a NAND gate 250 and an inverter 252 is effective to enable the gated set input of an all flip flop ALF. All flip flop ALF is then set by the next occurring revolution clock pulse $RC_0$. The reset output $\overline{AFL}$ is effective to set a second all flip flop ALFD when the first all flip flop ALF sets. The reset output ALFD of the second all flip flop ALFD, supplied as an input to AND gate 230, causes the flip flop GOS to be reset. As a consequence, the gated amplifier 175 is enabled to generate address extension register shift pulses ADEC so that address words are shifted through the address extension register 96 (FIGURE 11).

Inasmuch as the two all flip flops ALF and ALFD are set in response to a revolution marker $RC_0$ occurring at the beginning of an interrogation cycle of the magnetic drum 24, it will be seen that the address word contained in the address register 30 (FIGURE 1B) is the one associated with the last machine station 20 normally interrogated in an interrogation cycle. During the first word time of an interrogation cycle, the address word associated with the last machine station of an interrogation cycle is being shifted into the address extension register 96 (FIGURE 1B). At the same time, the address word associated with the first machine station to be interrogated in an interrogation cycle is being read into the address register 30. During the second word time of an interrogation cycle, the address word associated with the first machine station 20 is shifted from the address register 30 to the address extension register 96 and the address word corresponding to the second machine station is being read into the address register. When the second address word is decoded in the decoder-scanner 32 (FIGURE 1B) the scanner output line 32 connected in the switching logic 22 so as to interrogate the production status of the second machine station 20 is energized. This particular scanner output line is designated SC–2 and is also connected through an inverter 254 to the gated reset input of the second all flip flop ALFD. Upon termination of the energization of scanner output line SC–2, the second all flip flop ALFD reset. The reset output ALFD of second all flip flop ALFD is effective by way of gates 244 and 246 to set the flip flop GOS. Thus, the address word associated with the very first machine station 50 is retained in the address extension register 96. Now, on ensuing cycles of the magnetic drum 24, a selected address signal for locating the stored data words associated with the first machine station is repetitively generated. The output of the data words in collated message form for this first machine station is carried out in the manner described above.

After the complete message has been transmitted to the output device 118, an end-of-message signal is transmitted back to the search and output control circuit 90 for resetting the message output flip flop MOF. When the message output flip flop MOF resets, its reset output $\overline{MOF}$, applied through a NAND gate 260 and NAND gate 240, causes the address advance flip flop AAF to set with the termination of the selected address signal SAD associated with the first machine station. As described above, the setting of the address advance flip flop AAF causes the flip flop GOS to be reset through AND gate 230. One word time later when the address advance flip flop AAF is reset by a word clock pulse $WC_0$, the reset output $\overline{AAF}$ is effective by way of gates 244 and 246, to set flip flop GOS. In addition, the reset output $\overline{AAF}$, when the address advance flip flop AAF resets, causes the message output flip flop MOF to be again set through NAND gate 250. Thus, during this one word time after the occurrence of the selected address signal SAD associated with the first machine station, the address word associated with the second machine station is shifted into the address extension register 96 and retained there. With the message output flip flop MOF again set, the words of the next message are read sequentially into the data register 102 for transmission to the output device 118. This operation automatically repeats itself for each machine station 20 in sequence.

To automatically terminate this operation, the next energized scanner output line SC–X after the last machine station has been read out is connected through an inverter 260 to an AND gate 264. The other inputs to AND gate 264 are the seleced address signal SAD and signal MNW, a signal generated by the track select circuitry 76 (FIGURE 1B) when the first word of a message is being loaded into the data register 102. When the output operation sequence again repeats after the message associated with the last machine station 20 has been transferred to the output device 118, the output of AND gate 264 enables the gated reset input of the all flip flop ALF such that it is reset by the next occurring word clock pulse $WC_0$. With the all flip flop ALF reset, its set output ALF disables NAND gate 240 by way of NAND gate 260 such that the message output flip flop MOF is no longer effective to operate the address flip flop AAF. At the same time, the set output ALF of the all flip flop ALF is applied to the A.C. input of an A.C. gate 266. The output of the A.C. gate 266 drives the flip flop GOS to its reset condition. Address words now shift through the address extension register 96 and the selected address signal SAD disappears.

The above-described automatic address advance or all message output function may be carried out only on the basis of operating machine stations; a nonoperating machine station being distinguished from a machine station which happens to be on down time during a message output function. The search and output control circuit 90 (FIGURE 1B) operates to automatically eliminate nonopertaing machine stations from the message output sequence. Thus, the time of the output device is not unnecessarily occupied with the printing out of messages for those machine stations which have nothing to report.

As described in the above-noted copending application Serial No. 437,781, it may become necessary to provide a copy register for accepting mass transfer of the static and dynamic data recorded in the main store section of the magnetic drum 24. The copy register comprises as many data tracks as there are in the main store. That is, the copy register includes at least one employee number track, at least one job number track, etc. On a given signal, the static and dynamic data words are read from the data tracks 40, 50, 60, 62, and 64 (FIGURE 1A) into corresponding data tracks in the copy register. This may be accomplished in several drum revolutions. Thus, the main store section of the drum 24 is cleared almost immediately in preparation for accumulating static and dynamic data relative to a next work shift, for example.

The mass transfer of data from the main store to the copy register is synchronized such that the static and dynamic data recorded in the copy register occupy the same relative locations they occupied in the main store. Thus the copy register is addressable from the same drum address track 26. The all message output function is then carried out from the copy register rather than from the main store as described above. Although the copy register and the main store could share the same data register 102 (FIGURE 1B) for message output purposes, it is preferred to provide an additional data register for operating exclusively with the copy register. Thus, search operations may be performed in the main store using the data register 102 while the copy register and the automatic address advance logic circuitry of the search and output control circuit 90 are performing an ALL message output function. It will be appreciated that in order to accomplish these concurrent operations, a second address extension register corresponding to the one 196 disclosed in FIGURE 1B would be used to develop independent selected address signals SAD for this message output function.

In addition, as disclosed in the above-noted copending application, a transaction register may be incorporated with the disclosed system to provide buffer storage means for accepting random message outputs at times when the output device 118 is not available. Such a transaction register would also be comprised of tracks on the magnetic drum 24. The transaction register would typically be filled with messages assembled by the data register 102 rather than the data register associated with the copy register. The transaction register is a particularly important adjunct to the system for ascertaining the progress of selected or key machine stations at random intervals during a work shift. Such at random samplings may be preserved in the transaction register without having to maintain the output device 118 constantly on line to the system.

It will thus be seen that the objects set forth above, among those made apparent from the preceding description, are efficiently attained and, since certain changes may be made in the disclosed construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described the invention, what is claimed as new and what it is that is desired to be secured by Letters Patent is:

1. Apparatus for commonly addressing a plurality of associated cyclical memories, a first one of said memories storing a plurality of addresses, each address being associated with data stored in the remaining memories, each address and the data associated therewith being stored in predetermined relative locations in their respective memories, said apparatus comprising, in combination, (A) a search register adapted to hold selected data to be located in one of said cyclical memories;

(B) a comparator for comparing the selected data in said search register with corresponding data read from an appropriate one of said cyclical memories, (1) said comparator providing an output signal when comparison is achieved;

(C) address processing circuitry including (1) first means reading out said addresses from said first cyclical memory in repeating sequence, (2) second means connected to said first means and operating in response to said comparator output signal to retain the address associated with said selected data, and (3) third means connected to said first and second means for developing a selected address signal in each successive cycle of said memories, (a) said selected address signal being capable of locating in said cyclical memories all data associated with said selected data.

2. The apparatus defined in claim 1 wherein said associated cyclical memories are parallel tracks on a magnetic drum.

3. Apparatus for locating selected data from a plurality of messages stored in a cyclical memory, each message and an associated message address stored in predetermined relative locations in said memory, said apparatus comprising, in combination, (A) a search register;

(B) means entering selected data to be located into said search register;

(C) a first comparator for continuously comparing the data in said search register with corresponding data of each message read successively from the memory, (1) said first comparator providing a signal upon location of comparable data in the memory;

(D) address register means, (1) said addresses being read from the memory into said address register means in repeating sequence, (2) said address register means being responsive to said first comparator output signal for storing the address associated with the located data; and (E) a second comparator for comparing the address stored in said address register means with addresses read in repeating sequence from the memory, (1) said second comparator, when comparison achieved, providing a locator signal for each cycle of the memory effective to locate in the memory the other data of the message including the located data.

4. The apparatus defined in claim 3 wherein the cyclical memory is a magnetic drum, the data of each message and the associated message address being recorded in parallel tracks on the drum.

5. Apparatus for addressing a cyclical memory to locate date stored therein, related data being grouped with associated addresses all stored in predetermined relative locations in said cyclical memory, said apparatus comprising, in combination, (A) a search register for holding seelcted data to be located in the memory;

(B) a first comparator for continuously comparing the selected data with corresponding data read from the memory, (1) said first comparator providing an output signal upon locating comparable data stored in the memory; and (C) address circuitry including (1) first means reading said addresses from said cyclical memory in repeating sequence, (2) second means connected to said first means and operating in response to the receipt of said comparator output signal to store the address associated with said located data, and (3) third means connected to said first and second means for developing an address signal during successive cycles of said memory, (a) said address signal serving to locate in the memory other data related to said selected data; and (D) a data register controlled by said address signal to accept located data selectively read from the memory.

6. The apparatus defined in claim 5 wherein the cyclical memory is a magnetic drum with the addresses stored in one circumferential track and corresponding data of each data group stored in separate circumferential tracks.

7. The apparatus defined in claim 6 wherein (1) said first address circuitry means includes an address register receiving said addresses read from the drum address track in repeating sequence, (2) said second address circuitry means includes an address extension register receiving said addresses from said address register in corresponding repeating sequence, (a) said address extension register being controlled in response to said first comparator output signal to retain the address associated with said located data, and (3) said third address circuitry means includes a second comparator continuously comparing the contents of said address and said address extension registers so as to develop said address signal each time the address associated with said located data is read from the drum address track into said address register.

8. The apparatus defined in claim 7 which further includes, (E) means for entering selected data into said search register for addressing the drum and for entering selected data into said data register for recording in a selected track on the drum under the control of an address signal.

9. The apparatus defined in claim 8 wherein the data and addresses are processed and stored in serial binary coded decimal format, said entry means (1) including a decimal to serial binary coded decimal converter.

10. The apparatus defined in claim 9 wherein said search and data registers are each bidirectional shift registers.

11. Apparatus for addressing a cyclical memory to locate coded data words stored therein, related data words being grouped with associated address words all stored in predetermined relative locations in said cyclical memory, said apparatus comprising, in combination, (A) a search register for holding a selected data word to be located in the memory;

(B) means for entering said selected data word in coded form into said search register;

(C) a search control circuit controlling said search register in response to a search command so as to continuously recirculate said selected data word therein;

(D) a first comparator for continuously comparing the selected data word recirculated in said search register with corresponding data words read successively from the memory, (1) said first comparator providing an output signal to said search control circuit upon locating a comparable data word stored in the memory;

(E) an address register receiving said address words read from the memory in repeating sequence;

(F) an address extension register receiving said address words from the output of said address register in corresponding repeating sequence, (1) said address extension register being controlled from said search control circuit in response to said first comparator output signal so as to retain the address word associated with the located data word;

(G) a second comparator continuously comparing the contents of said address and said address extension register so as to develop an address signal each time the address word associated with said located data word is received in said address register.

12. The apparatus defined in claim 11 wherein said cyclical memory is a magnetic drum with the address word stored in one circumferential track and corresponding data words of each data group stored in separate circumferential tracks.

13. The apparatus defined in claim 12 wherein said address words consist of a plurality of digits recorded and read out in serial binary decimal format, said address register and said address extension register, (1) each including a serial shift register through which said address words are shifted, (a) said address words being continuously shifted through said address shift register in repeating sequence, (b) said address words being selectively shifted through said address extension shift register from the output of the address shift register under the control of said search control circuit.

14. The apparatus defined in claim 13 wherein said data words consist of a plurality of digits likewise recorded and read out from the drum in serial binary coded decimal format, and (1) said search register comprises a shift register.

15. The apparatus defined in claim 14 wherein said first comparator is a serial binary bit comparator and said search control circuit comprises, (1) a search control flip-flop triggered to a first condition in response to a search command, (a) said search control flip-flop, while in said first condition, enabling the application of shift pulses to said search register so as to recirculate said selected data word, (2) a coincidence detector flip-flop connected to receive said first comparator output signal, said coincidence detector flip-flop (a) being triggered to a first condition at the beginning of each word comparison in said first comparator, and (b) triggered to a second condition during each word comparison upon the detection of a noncomparison of corresponding binary bits in the selected word and a corresponding data word read from the drum, (3) a coincidence established flip-flop connected to the outputs of said search control flip-flop and said coincidence detector flip-flop, said coincidence established flip-flop (a) being triggered to a first condition at the end of a word comparison if said coincidence detector flip-flop is in its first condition, (b) operating when triggered to its first condition to trigger said search control flip-flop to a second condition effective to terminate a search operation, and (c) operating when triggered to its first condition to inhibit the shifting of address words through said address extension shift register.

16. The apparatus defined in claim 15 wherein said search control further includes (4) an incorrect search flip-flop being triggered to a first condition under the control of said coincidence established flip-flop after all corresponding data words read from the drum have been compared with a selected data word to indicate the inability to locate a comparable data word.

17. The apparatus defined in claim 16 wherein said search control circuit further includes, (5) a repeat search flip-flop connected to receive a search command and an address signal derived on the basis of a located data word, said repeat search flip-flop (a) having an output connected to said search control flip-flop and said coincidence established flip-flop, and (b) operating in response to a search command and to said address signal to trigger said coincidence established flip-flop to a second condition and said search control flip-flop to its first condition so as to begin again comparing a selected data word recirculated in said search register with corresponding data words read from the drum after the last comparable corresponding data word.

18. A system for controlling the transfer of data words to and from a cyclical memory adapted to store related data words and associated address words in predetermined relative locations, said system comprising, in combination, (A) a search register adapted to hold a data word to be located in said memory;

(B) a comparator operating to compare the selected data word in said search register with corresponding data words read from said cyclical memory in sequence, and (1) providing a comparator output signal when a comparable data word is located;

(C) address circuitry for reading out said address words from said memory in repeating sequence, (1) said address circuitry operating in response to a comparator output signal to store the address word associated with said selected data word, and (2) providing an address signal properly timed relative to the cyclical operation of said memory to indicate the stored location in said memory of data words related to said comparable data word;

(D) a data register (1) controlled by said address signal so as to accept data words read from said memory corresponding to said comparable data word, (2) adapted to be loaded with selected data, and (3) controlled by said address signal to unload its contents into said memory for storage in the proper relative location to the related data words and associated address word.

19. The system defined in claim 18 wherein said cyclical memory is a magnetic drum, said address words being stored in at least one circumferential track on said drum, and said data words associated therewith being stored in separate circumferential drum tracks.

20. The system defined in claim 19 which further includes (E) track select circuitry for selecting a particular drum track for the transfer of data words to and from predetermined storage locations on said magnetic drum.

21. The system defined in claim 20 wherein said address words and said data words consist of a plurality of digits stored and transferred to and from said magnetic drum in serial binary coded decimal format, least significant digit, least significant bit first, and said data register (1) comprises a bidirectional shift register, (a) each stage of said shift register capable of storing a single binary bit of a data word.

22. The system defined in claim 21 which further includes (F) a search and output control circuit; and (G) means for generating a selected data word in serial binary coded decimal format, (1) said generating means controlled by said search and output control circuit to enter a selected data word serially into said search register when said selected data word is to be located on said drum and to enter said selected data word into said data register when said selected data word is to be recorded on said drum, (2) said selected data words being entered most significant digit, most significant bit first into the least significant digit end of said search and data registers.

23. The system defined in claim 22 wherein said data register is controlled to (1) shift a data word out from its least significant digit end for recording on said drum least significant digit, least significant bit first, and (2) shift a data word read least significant digit, least significant bit first from said drum into its most significant digit end.

24. The system defined in claim 23 wherein said search and output control circuit includes (1) an address advance flip-flop, (a) operating in response to an address signal locating one group of related data words stored on the drum to condition said address circuitry such as to store the next address word read out in sequence from the drum (b) whereby to derive a new address signal locating the data words associated with said next address word.

25. The system defined in claim 24 wherein the operation of said address advance flip-flop is automatically repeated so as to derive address signals locating all of the data words recorded on the drum in a predetermined sequence.

26. The system defined in claim 23 wherein said data register is connected to transfer digits of a data word stored therein to an output device, and said system further including, (H) means responsive to next digit requests from the output device to shift the digits of the data word in said data register successively to the most significant digit end of said data register for individual transfer to the output device, (1) whereby data words are transferred to the output device most significant digit first.

27. The system defined in claim 26 wherein said means responsive to next digit requests further operates to (1) load into said search register a data word to be located as recorded on the drum, and (2) load into said data register a selected data word for recording on the drum.

28. A system for monitoring a plurality of operating stations from a central point and accumulating dynamic and static data corresponding to each said station, wherein said dynamic data pertains to different events occurring at each station and said static data pertains to relatively fixed conditions prevailing at each said station, said system comprising, in combination, (A) a plurality of associated cyclical memories, (1) one of said memories storing addresses corresponding to each of said stations, (2) the remaining cyclical memories storing static and dynamic data pertaining to each said station in predetermined locations relative to the corresponding address stored in said one memory;

(B) address processing circuitry operating to read addresses from said one cyclical memory in sequence during each cycle;

(C) interrogating means operating in response to said addresses read into said address processing circuitry to periodically interrogate the corresponding stations in sequence to determine if an event has occurred;

(D) data processing means connected to said interrogating means and operating in response to the interrogation of each station in sequence to augment the separate accumulated dynamic data in said memories corresponding to those stations where said different events have occurred since last interrogated;

(E) a search register adapted to hold static or dynamic data to be located in said memories, (1) said data to be located pertaining to one of said stations;

(F) a comparator for comparing the selected data in said search register with corresponding static or dynamic data read from an appropriate one of said cyclical memories, (1) said comparator providing an output signal upon the location of comparable data;

(G) a search control circuit, (1) operating in response to said comparator output signal to control said address processing circuitry so as to retain the address corresponding to said one station;

(H) said address processing circuitry operating when said corresponding address is retained therein, to develop a selected address signal during each ensuing cycle of said memory for locating all static and dynamic data pertaining to said one station.

29. The system defined in claim 28 wherein said associated cyclical memories are separate circumferential tracks on a magnet drum.

30. The system defined in claim 29 which further includes, (I) track select circuitry operating to select a particular drum track for readout; and (J) a data register controlled by said selected address signal to accept static and dynamic data pertaining to said one station as read from said drum.

31. The system defined in claim 30 which further includes, (K) displays for visually displaying the data contents of said search and data registers.

32. The system defined in claim 30 wherein said static and dynamic data are in the form of discrete multidigit words recorded and read out from said drum least significant digit first in serial binary coded decimal format, and said data register (1) comprises a bidirectional shift register, (a) each stage thereof storing a single binary bit of a data word.

33. The system defined in claim 32 wherein a data word read from said drum is shifted into the most significant digit end of said data register least significant digit first, and said system further includes (L) means operating to shift a data word to be recorded on said drum most significant digit first into the least digit end of said data register, (1) said data word being shifted out of said data register least significant digit first from the least significant end thereof under the control of a selected address signal for recording in the proper location on said drum.

34. The system defined in claim 33 wherein said last named operating means further operates to (1) successively shift the digits of a data word in said data register toward the most significant digit end thereof for serial transfer most significant digit first to an output device.

References Cited

UNITED STATES PATENTS

| | | | |
|---|---|---|---|
| 3,311,891 | 3/1967 | Brady et al. | 340—172.5 |
| 3,300,765 | 1/1967 | Trostrud | 340—172.5 |
| 3,289,174 | 11/1966 | Brown et al. | 340—172.5 |
| 3,161,763 | 12/1964 | Glaser | 235—157 |

ROBERT C. BAILEY, *Primary Examiner.*

G. D. SHAW, *Assistant Examiner.*